(12) United States Patent
Xiao et al.

(10) Patent No.: US 12,375,246 B2
(45) Date of Patent: Jul. 29, 2025

(54) TECHNIQUES FOR INDICATING SOUNDING REFERENCE SIGNAL RESOURCES

(71) Applicant: QUALCOMM Incorporated, San Diego, CA (US)

(72) Inventors: Kexin Xiao, Shanghai (CN); Muhammad Sayed Khairy Abdelghaffar, San Jose, CA (US); Yu Zhang, San Diego, CA (US); Bo Chen, Beijing (CN); Runxin Wang, San Diego, CA (US); Yeliz Tokgoz, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 18/246,319

(22) PCT Filed: Oct. 29, 2020

(86) PCT No.: PCT/CN2020/124748
§ 371 (c)(1),
(2) Date: Mar. 22, 2023

(87) PCT Pub. No.: WO2022/087952
PCT Pub. Date: May 5, 2022

(65) Prior Publication Data
US 2023/0403118 A1 Dec. 14, 2023

(51) Int. Cl.
H04W 4/00 (2018.01)
H04B 7/0456 (2017.01)
(Continued)

(52) U.S. Cl.
CPC ......... H04L 5/0051 (2013.01); H04B 7/0456 (2013.01); H04B 7/0602 (2013.01);
(Continued)

(58) Field of Classification Search
None
See application file for complete search history.

(56) References Cited

U.S. PATENT DOCUMENTS 10,374,768 B2 * 8/2019 Harrison .............. H04B 7/0691
12,232,146 B2 * 2/2025 Sun ........................ H04L 5/0082
(Continued)

FOREIGN PATENT DOCUMENTS

CN 108112075 A 6/2018
CN 109600208 A 4/2019
(Continued)

OTHER PUBLICATIONS

Nokia et al., "Remaining Issues on Non-codebook Based UL-MIMO Transmission", 3GPP TSG-RAN WG1 Meeting AH1801, R1-1800749, No. Vancouver, Canada, Jan. 22, 2018-Jan. 26, 2018, 4 Pages.

(Continued)

Primary Examiner — Bob A Phunkulh
(74) Attorney, Agent, or Firm — Holland & Hart LLP/Qualcomm

(57) ABSTRACT

Methods, systems, and devices for wireless communications are described. A user equipment (UE) may transmit a capability message indicating a first number of one or more transmit antennas supported by the UE for antenna switching and a second number of ports supported for uplink transmission that exceeds the first number of one or more transmit antennas. The UE may receive, based on the capability message, a sounding reference signal (SRS) configuration indicating a mapping between each SRS resource or SRS resource group and a respective bit sequence of a set of bit sequences. The UE may receive a control message comprising one or more bit sequences of the set of bit sequences indicating one or more SRS resources or an SRS (Continued)

resource group based on the mapping. The UE may transmit one or more SRS signals based on the control message.

20 Claims, 19 Drawing Sheets

(51) Int. Cl.
*H04B 7/06* (2006.01)
*H04L 5/00* (2006.01)
*H04W 72/20* (2023.01)

(52) U.S. Cl.
CPC ......... *H04B 7/0628* (2013.01); *H04L 5/0094* (2013.01); *H04W 72/20* (2023.01)

(56) References Cited

U.S. PATENT DOCUMENTS

| | | | | |
|---|---|---|---|---|
| 2019/0103949 A1* | 4/2019 | Harrison | ............... | H04B 7/0456 |
| 2019/0207722 A1 | 7/2019 | Gao et al. | | |
| 2019/0372734 A1* | 12/2019 | Choi | ..................... | H04B 7/0628 |
| 2020/0107352 A1* | 4/2020 | Tsai | ..................... | H04B 7/0617 |
| 2020/0127876 A1* | 4/2020 | Shi | ..................... | H04L 25/0226 |
| 2020/0162133 A1* | 5/2020 | Harrison | ............... | H04W 52/08 |
| 2020/0204316 A1 | 6/2020 | Zhang et al. | | |
| 2020/0358493 A1 | 11/2020 | Hao et al. | | |
| 2021/0168839 A1* | 6/2021 | Su | ........................ | H04B 7/0691 |
| 2021/0367724 A1 | 11/2021 | Zhang et al. | | |
| 2022/0006501 A1* | 1/2022 | Kim | ..................... | H04W 24/10 |
| 2022/0159596 A1* | 5/2022 | Kim | ........................ | H04J 11/00 |
| 2022/0174510 A1* | 6/2022 | Kang | ................... | H04B 7/0691 |
| 2022/0217654 A1* | 7/2022 | Kang | .................... | H04W 52/14 |
| 2022/0394499 A1* | 12/2022 | Matsumura | ........... | H04L 5/0051 |
| 2023/0047048 A1* | 2/2023 | Liu | ..................... | H04B 7/0417 |
| 2023/0370219 A1* | 11/2023 | Ling | ..................... | H04L 5/0053 |
| 2024/0114504 A1* | 4/2024 | Gao | ..................... | H04L 5/0094 |

FOREIGN PATENT DOCUMENTS

CN 111630805 9/2020
CN 111769921 A 10/2020

OTHER PUBLICATIONS

Supplementary European Search Report—EP20959115—Search Authority—The Hague—May 31, 2024.
International Search Report and Written Opinion—PCT/CN2020/124748 —ISA/EPO—Jul. 20, 2021.

* cited by examiner

Control message 510

TECHNIQUES FOR INDICATING SOUNDING
REFERENCE SIGNAL RESOURCES

CROSS REFERENCE

The present Application is a 371 national stage filing of International PCT Application No. PCT/CN2020/124748 by XIAO et al. entitled "TECHNIQUES FOR INDICATING SOUNDING REFERENCE SIGNAL RESOURCES," filed Oct. 29, 2020, which is assigned to the assignee hereof, and which is expressly incorporated by reference in its entirety herein.

FIELD OF TECHNOLOGY

The following relates to wireless communications, including techniques for indicating sounding reference signal (SRS) resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured with sounding reference signal (SRS) resource sets for the UE to transmit SRS transmissions, where each SRS resource set may be allocated to a particular use case (e.g., antenna switching, codebook-based, non-codebook based, beam management). In some cases, to reduce SRS overhead, a single SRS resource set may be used for multiple use cases, such as for antenna switching SRS transmissions and codebook-based SRS transmissions. The base station may indicate to the UE which SRS resources within the set of SRS resources the UE should use for SRS transmissions, such as SRS transmissions according to a particular use case. In some cases, the base station may indicate SRS resources via an SRS resource indicator (SRI). However, conventional techniques for indicating SRS resources may be deficient.

SUMMARY

The described techniques relate to improved methods, systems, devices, and apparatuses that support techniques for indicating sounding reference signal (SRS) resources. Generally, the described techniques provide for a user equipment (UE) to reduce configuration overhead and resources associated with performing SRS transmissions. In some cases, the described techniques may support merged SRS resource sets such that SRS resources within one or more merged SRS resource sets may be used for multiple different SRS use cases (e.g., antenna switching, codebook-based, non-codebook based, beam management). In some cases, the described techniques may support indicating, to a UE, SRS resources within one or more merged SRS resource sets to be used for SRS transmissions, where the SRS resources may be configured for a particular SRS use case. Each SRS use case may be associated with a different number of ports, transmit antennas, and/or receive antennas utilized for the performance of the SRS use case. To account for the different antenna and/or port configurations for each use case, the indication of the configured SRS resources may be based on the SRS use case associated with the configured SRS resources.

For example, a UE may transmit a capability message indicating a first number of one or more transmit antennas supported by the UE for antenna switching and a second number of ports supported for uplink transmission that exceeds the first number of one or more transmit antennas. The UE may receive, based on the capability message, an SRS configuration indicating a mapping between each SRS resource group for at least a subset of a set of SRS resource groups and a respective bit sequence of a set of bit sequences. The UE may receive a control message comprising a first bit sequence of the set of bit sequences indicating a first SRS resource group of the subset of the set of SRS resource groups based on the mapping. Based on the control message, the UE may transmit a first SRS in a first SRS resource of the first SRS resource group based on the control message, and transmit a second SRS in a second SRS resource of the first SRS resource group based on the control message.

In another example, the UE may transmit a capability message indicating a first number of one or more transmit antennas supported by the UE for antenna switching and a second number of ports supported for uplink transmission that exceeds the first number of transmit antennas. The UE may receive, based on the capability message, a SRS configuration indicating a mapping between each SRS resource of a set of SRS resources and a respective bit sequence of a set of bit sequences. The UE may receive a control message comprising a first bit sequence of the set of bit sequences indicating a first SRS resource of the set of SRS resources and a second bit sequence of the set of bit sequences indicating a second SRS resource of the set of SRS resources based on the mapping. The UE may transmit a first SRS in the first SRS resource based on the first bit sequence indicated in the control message, and transmit a second SRS in the second SRS resource based on the second bit sequence indicated in the control message.

A method of wireless communications at a UE is described. The method may include transmitting a capability message indicating a first number of one or more transmit antennas supported by the UE for antenna switching and a second number of ports supported for uplink transmission that exceeds the first number of one or more transmit antennas, receiving, based on the capability message, a SRS configuration indicating a mapping between each SRS resource group for at least a subset of a set of SRS resource groups and a respective bit sequence of a set of bit sequences, receiving a control message including a first bit sequence of the set of bit sequences indicating a first SRS resource group of the subset of the set of SRS resource groups based on the mapping, transmitting a first SRS in a first SRS resource of the first SRS resource group based on the control message, and transmitting a second SRS in a second SRS resource of the first SRS resource group based on the control message.

An apparatus for wireless communications at a UE is described. The apparatus may include a processor, memory coupled with the processor, and instructions stored in the memory. The instructions may be executable by the processor to cause the apparatus to transmit a capability message indicating a first number of one or more transmit antennas supported by the UE for antenna switching and a second number of ports supported for uplink transmission that exceeds the first number of one or more transmit antennas, receive, based on the capability message, a SRS configuration indicating a mapping between each SRS resource group for at least a subset of a set of SRS resource groups and a respective bit sequence of a set of bit sequences, receive a control message including a first bit sequence of the set of bit sequences indicating a first SRS resource group of the subset of the set of SRS resource groups based on the mapping, transmit a first SRS in a first SRS resource of the first SRS resource group based on the control message, and transmit a second SRS in a second SRS resource of the first SRS resource group based on the control message.

Another apparatus for wireless communications at a UE is described. The apparatus may include means for transmitting a capability message indicating a first number of one or more transmit antennas supported by the UE for antenna switching and a second number of ports supported for uplink transmission that exceeds the first number of one or more transmit antennas, receiving, based on the capability message, a SRS configuration indicating a mapping between each SRS resource group for at least a subset of a set of SRS resource groups and a respective bit sequence of a set of bit sequences, receiving a control message including a first bit sequence of the set of bit sequences indicating a first SRS resource group of the subset of the set of SRS resource groups based on the mapping, transmitting a first SRS in a first SRS resource of the first SRS resource group based on the control message, and transmitting a second SRS in a second SRS resource of the first SRS resource group based on the control message.

A non-transitory computer-readable medium storing code for wireless communications at a UE is described. The code may include instructions executable by a processor to transmit a capability message indicating a first number of one or more transmit antennas supported by the UE for antenna switching and a second number of ports supported for uplink transmission that exceeds the first number of one or more transmit antennas, receive, based on the capability message, a SRS configuration indicating a mapping between each SRS resource group for at least a subset of a set of SRS resource groups and a respective bit sequence of a set of bit sequences, receive a control message including a first bit sequence of the set of bit sequences indicating a first SRS resource group of the subset of the set of SRS resource groups based on the mapping, transmit a first SRS in a first SRS resource of the first SRS resource group based on the control message, and transmit a second SRS in a second SRS resource of the first SRS resource group based on the control message.

In some examples of the method, apparatuses, and non-transitory computer-readable medium described herein, receiving the SRS configuration further may include operations, features, means, or instructions for receiving the SRS configuration indicating a mapping table that indicates the mapping between each SRS resource group for at least the subset of the set of SRS resource groups and the respective bit sequence of the set of bit sequences.

In some examples of the method, apparatuses, and non-transitory computer-readable medium described herein, receiving the SRS configuration further may include operations, features, means, or instructions for receiving the SRS configuration indicating a number of configured ports for antenna switching and a number of configured ports for uplink transmission, where the mapping may be based on the number of configured ports for antenna switching and the number of configured ports for uplink transmission.

In some examples of the method, apparatuses, and non-transitory computer-readable medium described herein, receiving the SRS configuration indicating the mapping further may include operations, features, means, or instructions for receiving the SRS configuration indicating a mapping between each SRS group of the set of SRS resource groups and a respective bit sequence of the set of bit sequences.

In some examples of the method, apparatuses, and non-transitory computer-readable medium described herein, transmitting the capability message further may include operations, features, means, or instructions for transmitting the capability message indicating a third number of one or more receive antennas supported for antenna switching, the SRS configuration based on the third number of receive antennas supported for antenna switching.

In some examples of the method, apparatuses, and non-transitory computer-readable medium described herein, the third number of one or more receive antennas exceeds the first number of one or more transmit antennas.

In some examples of the method, apparatuses, and non-transitory computer-readable medium described herein, receiving the control message further may include operations, features, means, or instructions for receiving a downlink control information message including the first bit sequence.

In some examples of the method, apparatuses, and non-transitory computer-readable medium described herein, each SRS resource group includes a single SRS resource of the SRS resource group.

In some examples of the method, apparatuses, and non-transitory computer-readable medium described herein, receiving the SRS configuration further may include operations, features, means, or instructions for receiving the SRS configuration indicating a codebook SRS configuration.

In some examples of the method, apparatuses, and non-transitory computer-readable medium described herein, each bit sequence of the set of bit sequences includes a single bit.

A method of wireless communications at a UE is described. The method may include transmitting a capability message indicating a first number of one or more transmit antennas supported by the UE for antenna switching and a second number of ports supported for uplink transmission that exceeds the first number of transmit antennas, receiving, based on the capability message, a SRS configuration indicating a mapping between each SRS resource of a set of SRS resources and a respective bit sequence of a set of bit sequences, receiving a control message including a first bit sequence of the set of bit sequences indicating a first SRS resource of the set of SRS resources and a second bit sequence of the set of bit sequences indicating a second SRS resource of the set of SRS resources based on the mapping, transmitting a first SRS in the first SRS resource based on the first bit sequence indicated in the control message, and transmitting a second SRS in the second SRS resource based on the second bit sequence indicated in the control message.

An apparatus for wireless communications at a UE is described. The apparatus may include a processor, memory coupled with the processor, and instructions stored in the memory. The instructions may be executable by the processor to cause the apparatus to transmit a capability message indicating a first number of one or more transmit antennas supported by the UE for antenna switching and a second number of ports supported for uplink transmission that exceeds the first number of transmit antennas, receive, based on the capability message, a SRS configuration indicating a mapping between each SRS resource of a set of SRS resources and a respective bit sequence of a set of bit sequences, receive a control message including a first bit sequence of the set of bit sequences indicating a first SRS resource of the set of SRS resources and a second bit sequence of the set of bit sequences indicating a second SRS resource of the set of SRS resources based on the mapping, transmit a first SRS in the first SRS resource based on the first bit sequence indicated in the control message, and transmit a second SRS in the second SRS resource based on the second bit sequence indicated in the control message.

Another apparatus for wireless communications at a UE is described. The apparatus may include means for transmitting a capability message indicating a first number of one or more transmit antennas supported by the UE for antenna switching and a second number of ports supported for uplink transmission that exceeds the first number of transmit antennas, receiving, based on the capability message, a SRS configuration indicating a mapping between each SRS resource of a set of SRS resources and a respective bit sequence of a set of bit sequences, receiving a control message including a first bit sequence of the set of bit sequences indicating a first SRS resource of the set of SRS resources and a second bit sequence of the set of bit sequences indicating a second SRS resource of the set of SRS resources based on the mapping, transmitting a first SRS in the first SRS resource based on the first bit sequence indicated in the control message, and transmitting a second SRS in the second SRS resource based on the second bit sequence indicated in the control message.

A non-transitory computer-readable medium storing code for wireless communications at a UE is described. The code may include instructions executable by a processor to transmit a capability message indicating a first number of one or more transmit antennas supported by the UE for antenna switching and a second number of ports supported for uplink transmission that exceeds the first number of transmit antennas, receive, based on the capability message, a SRS configuration indicating a mapping between each SRS resource of a set of SRS resources and a respective bit sequence of a set of bit sequences, receive a control message including a first bit sequence of the set of bit sequences indicating a first SRS resource of the set of SRS resources and a second bit sequence of the set of bit sequences indicating a second SRS resource of the set of SRS resources based on the mapping, transmit a first SRS in the first SRS resource based on the first bit sequence indicated in the control message, and transmit a second SRS in the second SRS resource based on the second bit sequence indicated in the control message.

In some examples of the method, apparatuses, and non-transitory computer-readable medium described herein, receiving the SRS configuration further may include operations, features, means, or instructions for receiving the SRS configuration indicating a codebook SRS configuration.

In some examples of the method, apparatuses, and non-transitory computer-readable medium described herein, receiving the SRS configuration further may include operations, features, means, or instructions for receiving the SRS configuration indicating a mapping table corresponding to the mapping, where the respective bit sequences indicates respective indexes to the mapping table.

In some examples of the method, apparatuses, and non-transitory computer-readable medium described herein, transmitting the capability message further may include operations, features, means, or instructions for transmitting the capability message indicating a third number of one or more receive antennas supported for antenna switching, the SRS configuration based on the third number of receive antennas supported for antenna switching.

In some examples of the method, apparatuses, and non-transitory computer-readable medium described herein, the third number of one or more receive antennas exceeds the first number of one or more transmit antennas.

In some examples of the method, apparatuses, and non-transitory computer-readable medium described herein, receiving the control message further may include operations, features, means, or instructions for receiving a downlink control information message including the first bit sequence and the second bit sequence.

A method of wireless communications at a base station is described. The method may include receiving, from a UE, a capability message indicating a first number of one or more transmit antennas supported by the UE for antenna switching and a second number of ports supported for uplink transmission that exceeds the first number of one or more transmit antennas, transmitting, based on the capability message, a SRS configuration indicating a mapping between each SRS resource group for at least a subset of a set of SRS resource groups and a respective bit sequence of a set of bit sequences, transmitting a control message including a first bit sequence of the set of bit sequences indicating a first SRS resource group of the subset of the set of SRS resource groups based on the mapping, receiving a first SRS in a first SRS resource of the first SRS resource group based on the control message, and receiving a second SRS in a second SRS resource of the first SRS resource group based on the control message.

An apparatus for wireless communications at a base station is described. The apparatus may include a processor, memory coupled with the processor, and instructions stored in the memory. The instructions may be executable by the processor to cause the apparatus to receive, from a UE, a capability message indicating a first number of one or more transmit antennas supported by the UE for antenna switching and a second number of ports supported for uplink transmission that exceeds the first number of one or more transmit antennas, transmit, based on the capability message, a SRS configuration indicating a mapping between each SRS resource group for at least a subset of a set of SRS resource groups and a respective bit sequence of a set of bit sequences, transmit a control message including a first bit sequence of the set of bit sequences indicating a first SRS resource group of the subset of the set of SRS resource groups based on the mapping, receive a first SRS in a first SRS resource of the first SRS resource group based on the control message, and receive a second SRS in a second SRS resource of the first SRS resource group based on the control message.

Another apparatus for wireless communications at a base station is described. The apparatus may include means for receiving, from a UE, a capability message indicating a first number of one or more transmit antennas supported by the UE for antenna switching and a second number of ports supported for uplink transmission that exceeds the first number of one or more transmit antennas, transmitting, based on the capability message, a SRS configuration indicating a mapping between each SRS resource group for at least a subset of a set of SRS resource groups and a respective bit sequence of a set of bit sequences, transmitting a control message including a first bit sequence of the set of bit sequences indicating a first SRS resource group of the subset of the set of SRS resource groups based on the mapping, receiving a first SRS in a first SRS resource of the first SRS resource group based on the control message, and receiving a second SRS in a second SRS resource of the first SRS resource group based on the control message.

A non-transitory computer-readable medium storing code for wireless communications at a base station is described. The code may include instructions executable by a processor to receive, from a UE, a capability message indicating a first number of one or more transmit antennas supported by the UE for antenna switching and a second number of ports supported for uplink transmission that exceeds the first number of one or more transmit antennas, transmit, based on the capability message, a SRS configuration indicating a mapping between each SRS resource group for at least a subset of a set of SRS resource groups and a respective bit sequence of a set of bit sequences, transmit a control message including a first bit sequence of the set of bit sequences indicating a first SRS resource group of the subset of the set of SRS resource groups based on the mapping, receive a first SRS in a first SRS resource of the first SRS resource group based on the control message, and receive a second SRS in a second SRS resource of the first SRS resource group based on the control message.

In some examples of the method, apparatuses, and non-transitory computer-readable medium described herein, transmitting the SRS configuration further may include operations, features, means, or instructions for transmitting the SRS configuration indicating a mapping table that indicates the mapping between each SRS resource group for at least the subset of the set of SRS resource groups and the respective bit sequence of the set of bit sequences.

In some examples of the method, apparatuses, and non-transitory computer-readable medium described herein, transmitting the SRS configuration further may include operations, features, means, or instructions for transmitting the SRS configuration indicating a number of configured ports for antenna switching and a number of configured ports for uplink transmission, where the mapping may be based on the number of configured ports for antenna switching and the number of configured ports for uplink transmission.

In some examples of the method, apparatuses, and non-transitory computer-readable medium described herein, transmitting the SRS configuration indicating the mapping further may include operations, features, means, or instructions for transmitting the SRS configuration indicating a mapping between each SRS group of the set of SRS resource groups and a respective bit sequence of the set of bit sequences.

In some examples of the method, apparatuses, and non-transitory computer-readable medium described herein, receiving the capability message further may include operations, features, means, or instructions for receiving the capability message indicating a third number of one or more receive antennas supported for antenna switching, the SRS configuration based on the third number of receive antennas supported for antenna switching.

In some examples of the method, apparatuses, and non-transitory computer-readable medium described herein, the third number of one or more receive antennas exceeds the first number of one or more transmit antennas.

In some examples of the method, apparatuses, and non-transitory computer-readable medium described herein, transmitting the control message further may include operations, features, means, or instructions for transmitting a downlink control information message including the first bit sequence.

In some examples of the method, apparatuses, and non-transitory computer-readable medium described herein, each SRS resource group includes a single SRS resource of the SRS resource group.

In some examples of the method, apparatuses, and non-transitory computer-readable medium described herein, transmitting the SRS configuration further may include operations, features, means, or instructions for transmitting the SRS configuration indicating a codebook SRS configuration.

In some examples of the method, apparatuses, and non-transitory computer-readable medium described herein, each bit sequence of the set of bit sequences includes a single bit.

A method of wireless communications at a base station is described. The method may include receiving, from a UE, a capability message indicating a first number of one or more transmit antennas supported by the UE for antenna switching and a second number of ports supported for uplink transmission that exceeds the first number of transmit antennas, transmitting, based on the capability message, a SRS configuration indicating a mapping between each SRS resource of a set of SRS resources and a respective bit sequence of a set of bit sequences, transmitting a control message including a first bit sequence of the set of bit sequences indicating a first SRS resource of the set of SRS resources and a second bit sequence of the set of bit sequences indicating a second SRS resource of the set of SRS resources based on the mapping, receiving a first SRS in the first SRS resource based on the first bit sequence indicated in the control message, and receiving a second SRS in the second SRS resource based on the second bit sequence indicated in the control message.

An apparatus for wireless communications at a base station is described. The apparatus may include a processor, memory coupled with the processor, and instructions stored in the memory. The instructions may be executable by the processor to cause the apparatus to receive, from a UE, a capability message indicating a first number of one or more transmit antennas supported by the UE for antenna switching and a second number of ports supported for uplink transmission that exceeds the first number of transmit antennas, transmit, based on the capability message, a SRS configuration indicating a mapping between each SRS resource of a set of SRS resources and a respective bit sequence of a set of bit sequences, transmit a control message including a first bit sequence of the set of bit sequences indicating a first SRS resource of the set of SRS resources and a second bit sequence of the set of bit sequences indicating a second SRS resource of the set of SRS resources based on the mapping, receive a first SRS in the first SRS resource based on the first bit sequence indicated in the control message, and receive a second SRS in the second SRS resource based on the second bit sequence indicated in the control message.

Another apparatus for wireless communications at a base station is described. The apparatus may include means for receiving, from a UE, a capability message indicating a first number of one or more transmit antennas supported by the UE for antenna switching and a second number of ports supported for uplink transmission that exceeds the first number of transmit antennas, transmitting, based on the capability message, a SRS configuration indicating a mapping between each SRS resource of a set of SRS resources and a respective bit sequence of a set of bit sequences, transmitting a control message including a first bit sequence of the set of bit sequences indicating a first SRS resource of the set of SRS resources and a second bit sequence of the set of bit sequences indicating a second SRS resource of the set of SRS resources based on the mapping, receiving a first SRS in the first SRS resource based on the first bit sequence indicated in the control message, and receiving a second SRS in the second SRS resource based on the second bit sequence indicated in the control message.

A non-transitory computer-readable medium storing code for wireless communications at a base station is described. The code may include instructions executable by a processor to receive, from a UE, a capability message indicating a first number of one or more transmit antennas supported by the UE for antenna switching and a second number of ports supported for uplink transmission that exceeds the first number of transmit antennas, transmit, based on the capability message, a SRS configuration indicating a mapping between each SRS resource of a set of SRS resources and a respective bit sequence of a set of bit sequences, transmit a control message including a first bit sequence of the set of bit sequences indicating a first SRS resource of the set of SRS resources and a second bit sequence of the set of bit sequences indicating a second SRS resource of the set of SRS resources based on the mapping, receive a first SRS in the first SRS resource based on the first bit sequence indicated in the control message, and receive a second SRS in the second SRS resource based on the second bit sequence indicated in the control message.

In some examples of the method, apparatuses, and non-transitory computer-readable medium described herein, transmitting the SRS configuration further may include operations, features, means, or instructions for transmitting the SRS configuration indicating a codebook SRS configuration.

In some examples of the method, apparatuses, and non-transitory computer-readable medium described herein, transmitting the SRS configuration further may include operations, features, means, or instructions for transmitting the SRS configuration indicating a mapping table corresponding to the mapping, where the respective bit sequences indicates respective indexes to the mapping table.

In some examples of the method, apparatuses, and non-transitory computer-readable medium described herein, receiving the capability message further may include operations, features, means, or instructions for receiving the capability message indicating a third number of one or more receive antennas supported for antenna switching, the SRS configuration based on the third number of receive antennas supported for antenna switching.

In some examples of the method, apparatuses, and non-transitory computer-readable medium described herein, the third number of one or more receive antennas exceeds the first number of one or more transmit antennas.

In some examples of the method, apparatuses, and non-transitory computer-readable medium described herein, transmitting the control message further may include operations, features, means, or instructions for transmitting a downlink control information message including the first bit sequence and the second bit sequence.

DETAILED DESCRIPTION

Figure 1:
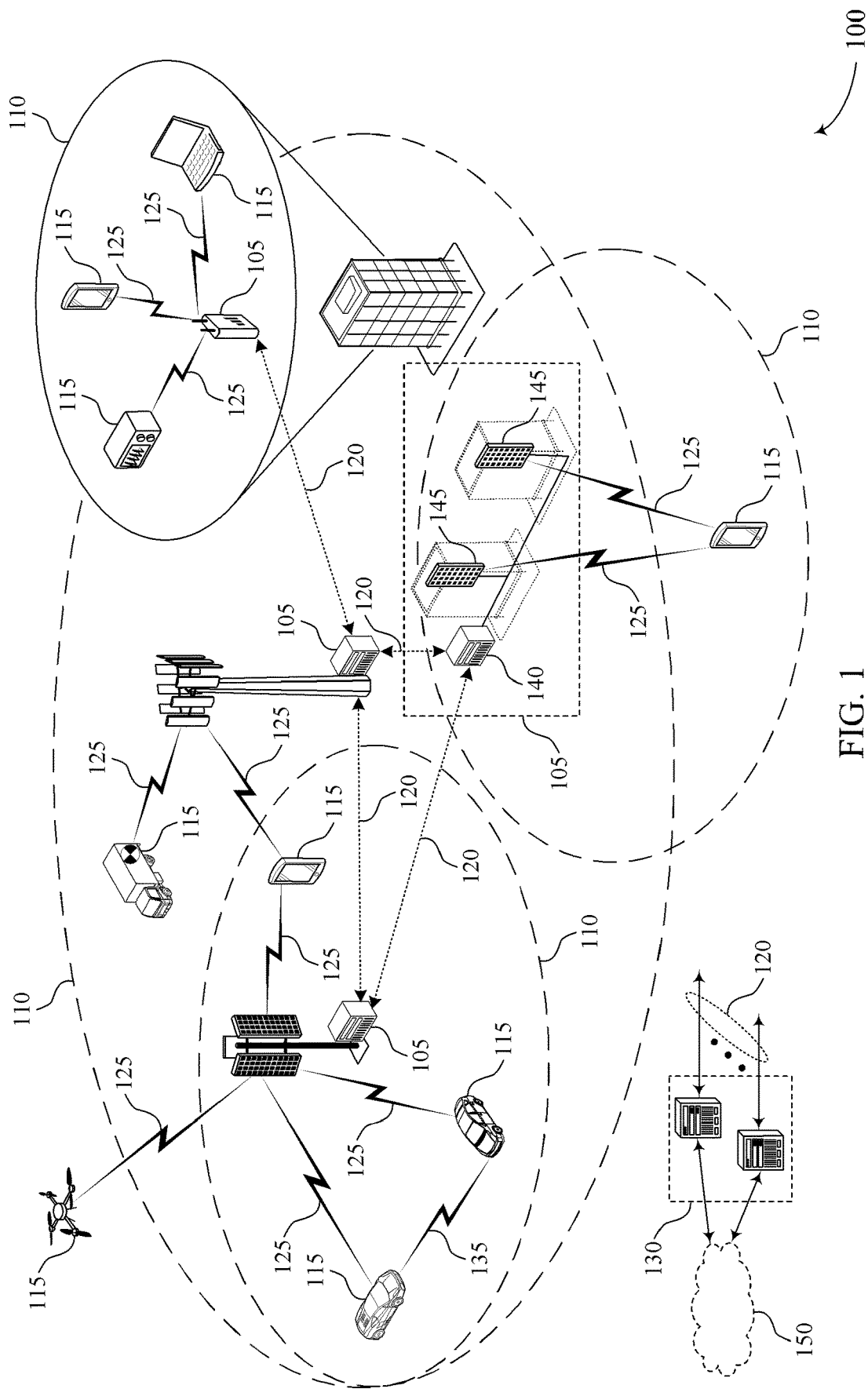
FIG. 1 illustrates an example of a system for wireless communications that supports techniques for indicating sounding reference signal (SRS) resources in accordance with aspects of the present disclosure.

In some wireless communications systems, a user equipment (UE) may transmit a sounding reference signal (SRS) during at least one SRS resource to a base station, such that the base station may determine one or more channel conditions at the UE (e.g., for scheduling of uplink transmissions). In some examples, the base station may configure the UE with multiple SRS resources (e.g., an aperiodic, a semi-persistent, or a periodic configuration), which may be grouped into an SRS resource set based on a use case (e.g., grouped for antenna switching, based on a codebook or not based on a codebook, for beam management, or the like). For example, the UE may perform an SRS antenna switching operation to enable downlink beamforming in time division duplexed (TDD) bands by using channel reciprocity (e.g., the channel responses may be the same in both directions). Further, SRS antenna switching may be used for uplink sounding (e.g., for physical uplink shared channel scheduling and/or beamforming). During the antenna switching operation, the base station may configure the UE with multiple SRS resource sets, such as up to two SRS resource sets. In some other examples, such as for a transmission based on a codebook, the base station may configure the UE with a single SRS resource set. It may be beneficial for the UE to merge the usage of the downlink channel state information (CSI) acquisition during the antenna switching operation and the uplink codebook selection to reduce signaling overhead related to SRS transmissions resulting in a large pool or SRS resources within one or more SRS resource sets. However, the antenna switching operation and the transmission based on the codebook may use a different number of SRS resources within an SRS resource set based on a number of ports, receive antennas, and/or transmit antennas utilized for each use case and conventional techniques for indicating which SRS resources to use (e.g., an SRS resource indicator (SRI) field) may not currently account for a large pool of SRS resources.

To indicate to a UE which resources to use for SRS transmissions of a particular use case, the UE may be configured with a mapping between SRS resources or SRS resource groups within an SRS resource set and a bit sequence, such as an SRI bit sequence. In some cases, the mapping may be based on a capability of the UE. The UE may receive a control message including one or more SRI bit sequences and determine the one or more SRS resources configured for SRS transmissions by the UE based on the mapping. In a first example, the SRS resources within an SRS resource set may be grouped and the lookup table may map an SRI bit field to one of the groups of SRS resources. In a second example, the set of groups may be down-converted to a subset of groups and the lookup table may map an SRI bit field to one of groups within the subset of groups. In either example, the UE may receive one SRI bit field that may indicate the use of multiple SRS resources included within a group. In some cases, the UE may be configured with a lookup table that may map SRI bit sequences to SRS resources such that a multi-bit SRI field indicates one SRS resource. As such, the UE may receive multiple SRI fields if multiple SRS resources are configured for the UE to use for SRS transmissions.

Particular aspects of the subject matter described herein may be implemented to realize one or more advantages. The described techniques may support improvements in SRS transmissions by implementing an indication technique for indicating SRS resources within an SRS resource set that are allocated for SRS transmissions. The described techniques may decrease signaling overhead, improve reliability, and decrease latency among other advantages. As such, supported techniques may include improved network operations and, in some examples, may promote network efficiencies, among other benefits.

Aspects of the disclosure are initially described in the context of wireless communications systems. Aspects are then described with respect to process flows. Aspects of the disclosure are further illustrated by and described with reference to apparatus diagrams, system diagrams, and flowcharts that relate to techniques for indicating SRS resources.

FIG. 1 illustrates an example of a wireless communications system 100 that supports techniques for indicating SRS resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems (e.g., wireless communications system 100), a UE 115 may be configured to support merged SRS resource sets such that SRS resources within a merged SRS resource set may be used for multiple different SRS use cases (e.g., antenna switching, codebook-based, non-codebook based, beam management). In such cases, a base station 105 may indicate, to a UE 115, SRS resources within an SRS resource set (e.g., merged SRS resource set) the UE 115 may use for SRS transmissions. The indication may be based on the one or more SRS use cases, where each SRS use case may be associated with a different number of ports, transmit antennas, and/or receive antennas utilized for the performance of the SRS use case.

For example, a UE 115 may transmit, to a base station 105, a capability message indicating a first number of one or more transmit antennas supported by the UE 115 for antenna switching and a second number of ports supported for uplink transmission that exceeds the first number of one or more transmit antennas. The UE 115 may receive, based on the capability message, an SRS configuration indicating a mapping between each SRS resource group for at least a subset of a set of SRS resource groups and a respective bit sequence of a set of bit sequences. The UE 115 may receive a control message comprising a first bit sequence of the set of bit sequences indicating a first SRS resource group of the subset of the set of SRS resource groups based on the mapping. Based on the control message, the UE 115 may transmit a first SRS in a first SRS resource of the first SRS resource group based on the control message, and transmit a second SRS in a second SRS resource of the first SRS resource group based on the control message.

In another example, the UE 115 may transmit, to a base station 105, a capability message indicating a first number of one or more transmit antennas supported by the UE 115 for antenna switching and a second number of ports supported for uplink transmission that exceeds the first number of transmit antennas. The UE 115 may receive, based on the capability message, a SRS configuration indicating a mapping between each SRS resource of a set of SRS resources and a respective bit sequence of a set of bit sequences. The UE 115 may receive a control message comprising a first bit sequence of the set of bit sequences indicating a first SRS resource of the set of SRS resources and a second bit sequence of the set of bit sequences indicating a second SRS resource of the set of SRS resources based on the mapping. The UE 115 may transmit a first SRS in the first SRS resource based on the first bit sequence indicated in the control message, and transmit a second SRS in the second SRS resource based on the second bit sequence indicated in the control message.

Figure 2:
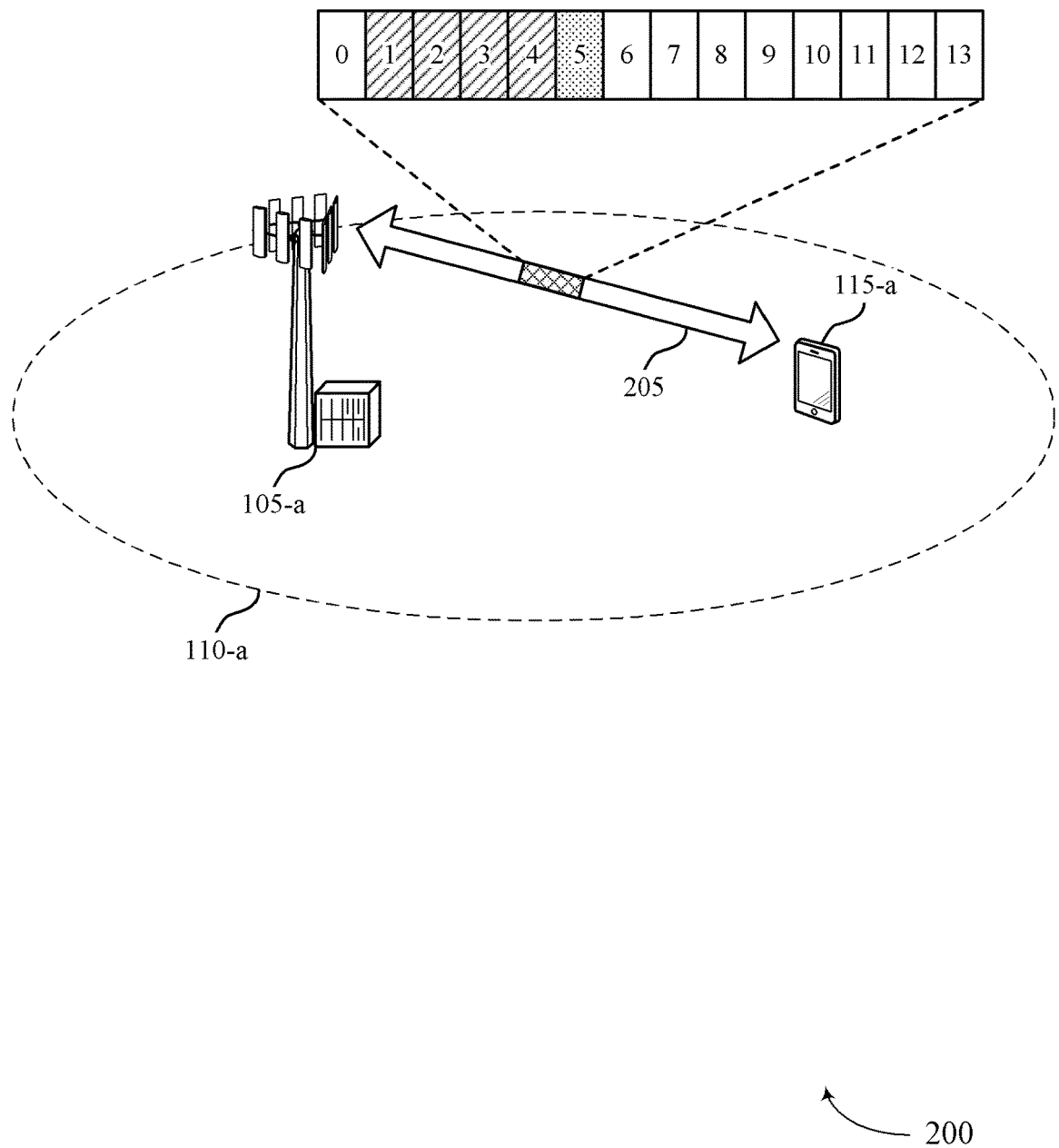
FIGS. 2 through 5 illustrate examples of wireless communications systems that support techniques for indicating SRS resources in accordance with aspects of the present disclosure.

FIG. 2 illustrates an example of a wireless communications system 200 that supports techniques for indicating SRS resources in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a may implement an SRS resource indication procedure. For example, base station 105-a may indicate, to UE 115-a, one or more SRS resources for UE 115-a to use to transmit SRS transmissions to base station 105-a. Additionally or alternatively, other wireless devices, such a UE 115 or base station 105, may implement the SRS resource indication procedure and/or receive the SRS indication.

In some cases, such as in wireless communications system 200 (e.g., an NR communications system), UE 115-a may communicate with base station 105-a via one or more communication links 205. For example, base station 105-a may transmit control signals (e.g., downlink control information (DCI) messages, radio resource control (RRC) messages, MAC-CE messages, configuration messages) and/or schedule downlink transmissions (e.g., downlink data transmissions, reference signal transmissions) to UE 115-a via communication link 205, which may be a downlink communications link. UE 115-a may transmit one or more uplink transmissions, such as reference signals (e.g., SRSs) in uplink configured resources (e.g., SRS resources) to base station 105-a via communication link 205, which may be an uplink communications link.

In some cases, base station 105-a may transmits a sounding reference signal configuration message to configure UE 115-a with one or more SRS resource sets 215 that UE 115-a may use to transmit SRS transmissions to base station 105-a. For instance, base station 105-a may transmit a configuration to UE 115-a indicating the one or more SRS resource sets 215. Base station 105-a may transmit the configuration via RRC or DCI, and may transmit indicators for transmission of aperiodic SRS or periodic (e.g., semi-persistent) SRS using configuration via RRC or DCI. Base station 105-a may configure UE 115-a with multiple SRS resources, which may be grouped into SRS resource sets depending on the use case or usage type (e.g., antenna switching, codebook-based, non-codebook based, beam management).

Each SRS resource set 215 may contain a set of SRS resources over which UE 115-a may transmit an SRS. UE 115-a and base station 105-a may support SRS resources that span 1, 2, 4, 8, or 12, adjacent symbols with up to a predefined number of ports (e.g., 8) per SRS resource. Up to a predefined number of SRS resource sets (e.g., 2) may be configured for SRS sounding with antenna switching. Each port of an SRS resource may be sounded in each symbol. In some cases, UE 115-a may transmit an SRS in the last 6 symbols of a slot (e.g., symbols 8 through 13) and may do so after transmitting a physical uplink shared channel (PUSCH) transmission in that slot. The SRS transmitted over an SRS resource may be a wideband SRS or a subband SRS, where a bandwidth of each SRS may be a multiple of 4 physical resource blocks (PRBs).

In some implementations, any symbol or number of symbols within a slot may be configured as an SRS resource. For example, a slot may include symbols 0 through 13, which may each be allocated for SRS transmissions. One or more SRS resources may be grouped in an SRS resource subset 215. In one example, base station 105-a may configure symbols 1, 2, 3, and 4 as SRS resources for a first use case (e.g., antenna switching), such that symbols 1, 2, 3, and 4 are included in the same SRS resource set 215, such as SRS resource set 215-a. In another example, base station 105-a may configure symbol 5 as SRS resources for a second use case (e.g., codebook-based), such that symbol 5 may be referred to as an SRS resource set 215, such as SRS resource set 215-b.

In some cases, UE 115-a may be configured to use (e.g., may be physically present at the UE or enabled) a number of transmit antennas as well as a number of receive antennas. UE 115-a may use up to the number of transmit antennas to transmit signals and may use up to the number of receive antennas to receive signals. In some cases, the number of transmit antennas versus the number of receive antennas may be given by xTyR, where x may be equal to the number of transmit antennas and y may be equal to the number of receive antennas. For instance, 1T1R may correspond to UE 115-a having or being configured to use 1 transmit antenna and 1 receive antenna.

Performing SRS antenna switching may involve UE 115-a transmitting SRS to base station 105-a over the transmit antennas and base station 105-a exploiting channel reciprocity to perform downlink beamforming for a time division duplexed (TDD) channel. For instance, base station 105-a may receive the SRS, may perform uplink channel estimation, and may exploit channel reciprocity to determine a downlink channel estimation from the uplink channel estimation. Base station 105-a may use the downlink channel estimation for downlink beamforming. SRS resource sets 215 whose resources are used for antenna switching may be said to have an antenna switching usage type. Generally, SRS antenna switching may be supported if the number of transmit x≤y for xTyR (e.g., 1T2R, 2T4R, 1T4R, 1T4R/2T4R, or T=R). The number of SRS resources in an SRS resource set for antenna switching may be given by x/y. For example, an antenna switching SRS resource set 215 for a UE 115 configured with 1T4R may have four SRS resources.

For codebook-based transmissions, UE 115-a may be configured with a single SRS resource set 215 (e.g., SRS-ResourceSet) with usage type set to 'codebook.' Base station 105-*a* may transmit an SRI to indicate an SRS resource within the configured SRS resource set, where the SRI may have one or more bits. The maximum number of configured SRS resources for codebook-based transmission may have a predefined value. The predefined value may be 4 when the higher layer parameter, ul-FullPowerTransmission is set to a full power mode (e.g., fullpowerMode2). Performing codebook-based SRS communications may involve UE 115-*a* transmitting an SRS to base station 105-*a* to be used for uplink sounding. Based on measurements on the configured SRS, base station 105-*a* may sound the channel and may determine a suitable rank and precoder matrix. Determining the rank and precoder matrix may enable base station 105-*a* to perform PUSCH scheduling and/or to perform beamforming to receive a PUSCH transmission. When performing codebook-based SRS communications, UE 115-*a* may be configured for transmission of at least one multi-port SRS. In some cases, UE 115-*a* may utilize multiple SRS beams, where each SRS beam may correspond to a different device antenna panel with different directions, and where each panel may include a set of antenna elements corresponding to antenna ports of each multi-port SRS. SRS resource sets 215 whose resources are used for codebook-based SRS communications may be said to have a codebook usage type.

Typically, each SRS resource set 215 may map to mutually exclusive resources. For instance, SRS resource sets 215 associated with an antenna switching usage type (e.g., configured with usage type set to antenna switching, referred to as antenna switching SRS resource sets) may have resources that differ from SRS resource sets 215 with a codebook usage type (e.g., configured with usage type set to codebook, referred to as codebook SRS resource sets), such as SRS resource set 215-*a* and SRS resource set 215-*b*. In some implementations, codebook SRS resource sets 215 may be merged with antenna switching SRS resource sets 215. Merging may involve setting a codebook SRS resource set 215 as a subset of the SRS resources within the antenna switching SRS resource set 215. For example, SRS resource set 215-*a* may be the merged resource set that may be used for antenna switching and codebook-based SRS. Merging the SRS resource sets 215 may decrease a number of configurations for SRS or a total number of resources used for transmitting SRSs, which may enable base station 105-*a* to more flexibly schedule resources for other types of transmissions or transmissions from other UEs.

Base station 105-*a* may transmit an SRI to differentiate between whether an SRS within the merged SRS resource set 215-*a* is allocated for a codebook SRS (e.g., an SRS used for codebook-based uplink communications) or an antenna switching SRS (e.g., an SRS used for antenna switching). If base station 105-*a* transmits an SRI to UE 115-*a* and receives a corresponding SRS, base station 105-*a* may determine that the SRS is a codebook SRS. If base station 105-*a* does not transmit an SRI to UE 115-*a* and receives an SRS, base station 105-*a* may determine that the SRS is an antenna switching SRS. Additionally or alternatively, the base station 105-*a* may send an explicit indicator for transmission of an SRS for antenna switching (e.g., periodic or aperiodic).

Additionally, base station 105-*a* may use the SRI to indicate which SRS resource set 215 or which resource of an SRS resource set 215 over which to transmit a codebook SRS. In one example, if x<y for xTyR, UE 115-*a* may use the SRI 210 to select between resources within an antenna switching SRS resource set. For instance, for 1T2R, if UE 115-*a* receives a one-bit SRI 210, UE 115-*a* may select between a first SRS resource of the antenna switching SRS resource set 215 and a second SRS resource of the antenna switching SRS resource set 215 based on a value of the bit. If the bit is a '0', UE 115-*a* may transmit a codebook SRS over the first SRS resource and if the bit is a '1', UE 115-*a* may transmit a codebook SRS over the second SRS resource. Additional bits may be used to select between more than two SRS resources.

By using the SRI 210 to indicate which SRS resource set or resource of an SRS resource set over which to transmit an SRS associated with the first usage type, the base station 105 and the UE 115 may have a greater number of resources over which the SRS associated with the first usage type may be transmitted. However, a UE 115 may be configured with a different number of transmit antennas for antenna switching and PUSCH transmission (e.g., codebook SRS usage). When the number of ports for PUSCH transmission (e.g., 2 ports or 4 ports) is larger than the number of ports for antenna switching such as in the case that the UE 115 is configured with 1T8R for antenna switching and 2 or 4 ports for PUSCH transmission, then the base station 105 may indicate multiple SRS resources via SRI. However, conventional configurations of an SRI indicate that the SRI may include 1-bit or 2-bits.

A UE 115 may be configured with a number, z, ports (e.g., a maximal number of ports) for PUSCH transmission and configured with a number, x, ports for antenna switching where z={1,2,4} and x={1,2,4}. In some cases, one or more SRS resource sets (e.g., S>1, set>1, set 1, set 2, . . . , set S) may be configured for antenna switching. In the case that more than one set is configured, a subset or all of the sets may be used for codebook-based SRS as well as antenna switching SRS. The SRS resource set 215 for antenna switching may include a number, R, of resources, where R=y/x. Each resource may have a number, x, ports, and each set may include a number, Ns, resources, which satisfies $R=\Sigma_{s=1}^{S} N_S$. The SRS resource set 215 for codebook-based SRS may use multiple SRS resources within the merged SRS resource set 215 based on the value of z (e.g., Nc=ceil (z/x), Nc may be the number of bits to indicate the SRS resources for codebook-based SRS), where all of the codebook-based ports may be used in multiple SRS resources and multiple symbols of the SRS resource set 215. To indicate which SRS resources within the SRS resource set 215 are allocated for code-book based SRS, an SRI may be configured to indicate multiple SRS resources, such as for more the 2 bits, where the number of bits may be based on Nc=ceil(z/x)).

In some cases, to indicate which SRS resources within the SRS resource set 215 are allocated for code-book based SRS, the UE 115 may be configured with a mapping (e.g., via a lookup table) between SRS resources or SRS resource groups within an SRS resource set 215 and a bit sequence, such as an SRI bit sequence. In some cases, the mapping may be based on a capability of the UE 115. The UE 115 may receive a control message including one or more SRI bit sequences and determine the one or more SRS resources configured for SRS transmissions by the UE based on the mapping. In a first example, the SRS resources within an SRS resource set may be grouped and the lookup table may map an SRI bit field to one of the groups of SRS resources. UE 115-*a* may receive one SRI bit field that may indicate the use of multiple SRS resources included within a group. The number of SRS resources included in each group may equal Nc, such that each group includes the number of SRS resources used for codebook-based SRS. As such, base station 105-*a* may transmit one SRI field to indicate the SRS resources for codebook-based SRS. In another example, the set of groups may be down-converted to a subset of groups to lower the number of groups for consideration for codebook-based SRS and the lookup table may map an SRI bit field to one of groups within the subset of groups. In some cases, the UE may be configured with a lookup table that may map SRI bit sequences to SRS resources, rather than groups of SRS resources, such that a multi-bit SRI field indicates one SRS resource. As such, UE 115-a may receive multiple SRI fields if multiple SRS resources are configured for UE 115-a to use for SRS transmissions.

Figure 3:
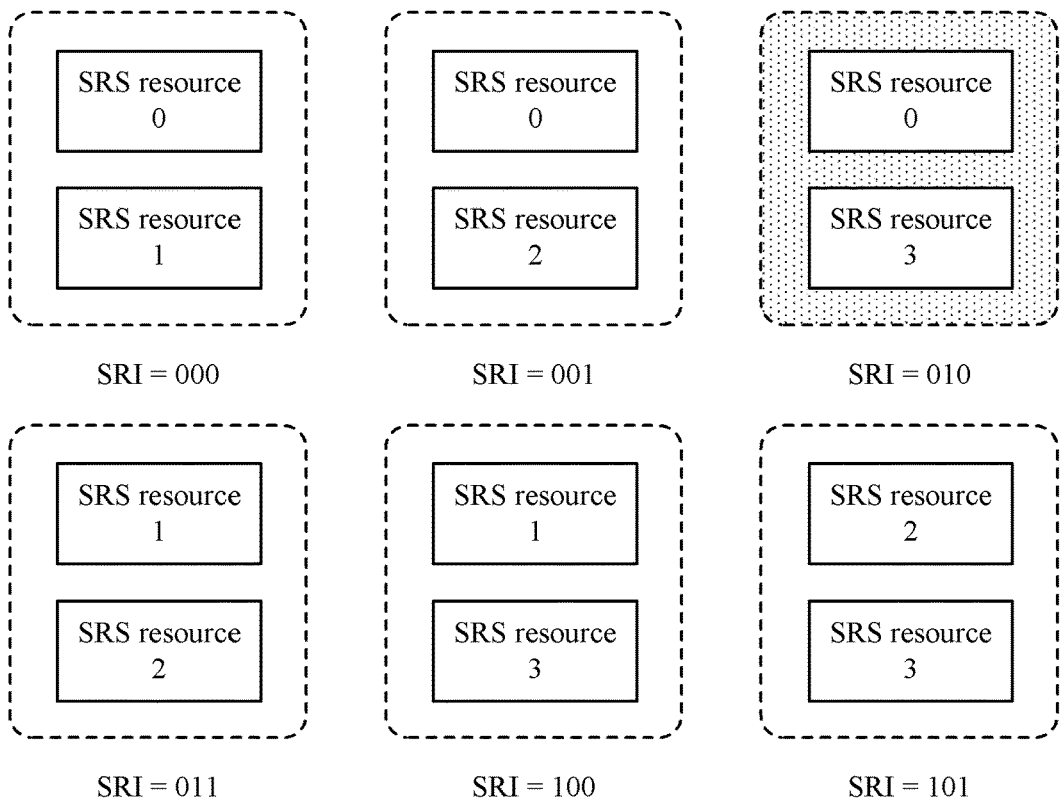
Figure 3:
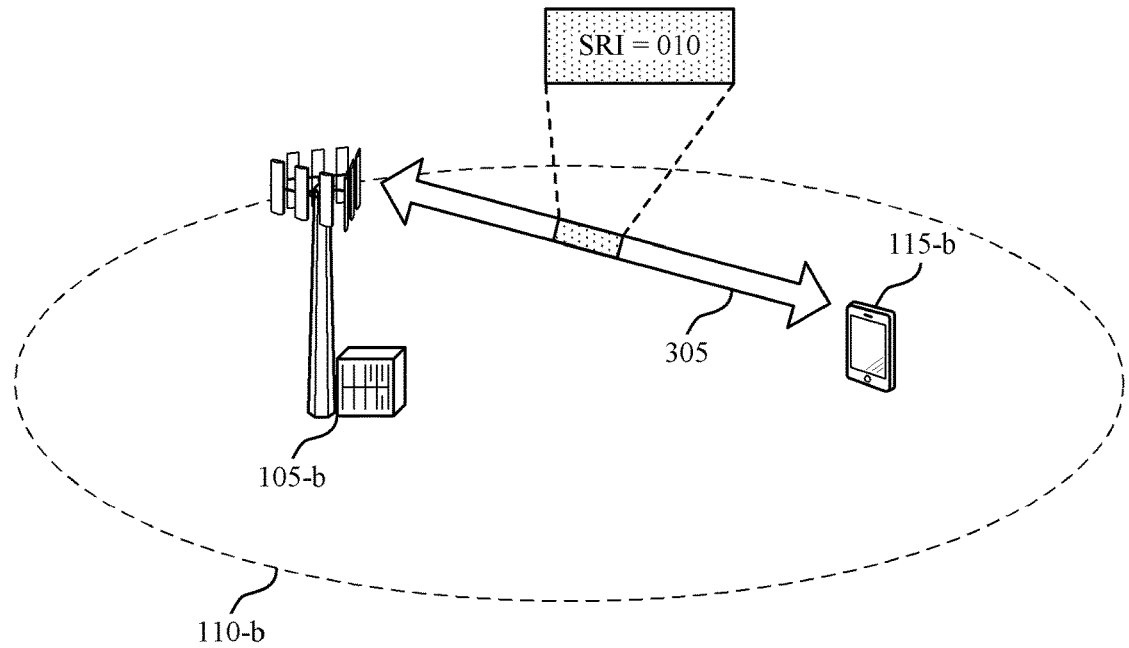

FIG. 3 illustrates an example of a wireless communications system 300 that supports techniques for indicating SRS resources in accordance with aspects of the present disclosure. The wireless communications system 300 may include base station 105-b and UE 115-b, which may be examples of a base station 105 and a UE 115 as described with reference to FIGS. 1 and 2. Base station 105-b may serve a geographic coverage area 110-b. In some cases, base station 105-b may implement an SRS resource indication procedure. For example, base station 105-b may indicate, to UE 115-b, one or more SRS resources for UE 115-b to use to transmit SRS transmissions to base station 105-b. Additionally or alternatively, other wireless devices, such a UE 115 or base station 105, may implement the SRS resource indication procedure and/or receive the SRS indication.

As described herein, UE 115-b may communicate with base station 105-b via one or more communication links 305. For example, base station 105-b may transmit control messages 310 and/or configuration messages, such as SRS configuration messages, to UE 115-b via communication link 305, which may be a downlink communications link. UE 115-b may transmit one or more uplink transmissions, such as reference signals (e.g., SRSs) in uplink configured resources (e.g., SRS resources) to base station 105-b via communication link 305, which may be an uplink communications link.

UE 115-b may be configured with a set of SRS resources that may be used for more than one use case, such as antenna switching and code-book based SRS. In the case the UE 115-b is configured with more ports for codebook-based SRS (z ports) than the number of transmit antennas for antenna switching SRS (x antennas), and the number of receive antennas (y antennas) for antenna switching is greater than the number of transmit antennas, such that z>x and y>x, then UE 115-b may be configured with a lookup table (or some other mapping) that provides an association between SRS resources and SRI bit sequences, where an SRI may be configured to include one, two, or more bits. The UE 115 may be configured with the lookup table aperiodically or semi-persistently via control signaling (e.g., via a configuration message), such as RRC signaling.

In some cases, such as the example depicted in FIG. 3, SRS resources may be grouped, where the number of resources included in a group may be based on the number of ports configured for codebook-based SRS (e.g., the number of SRS resources within each group may equal Nc as described with respect to FIG. 2). In some cases, such as for a 1T4R configuration for antenna switching, that results in UE 115-b being configured with four SRS resources (within a slot) for antenna switching SRS. In some cases, UE 115-b may be configured with two SRS resources sets, where each SRS resource set includes two SRS resources. In some cases, one of the two SRS resource sets (e.g., a first SRS resource set) may include one SRS resource and the other SRS resource set (e.g., the second SRS resource set) may include three bits. In some cases, UE 115-b may be configured with one SRS resource set (e.g., a combined SRS resource subset) that includes four SRS resources. UE 115-b may be configured to use a subset of the four SRS resources (e.g., in either the first SRS resource subset, the second SRS resource subset, or the combined SRS resource subset) for codebook-based SRS. In some cases, UE 115-b may be configured with 2 ports for codebook-based SRS, such that UE 115-b may use two SRS resources for codebook-based SRS usage. As such, each group of SRS resources may include two SRS resources. In some implementations, UE 115-a may be configured with a set of SRS groups that covers each combination of SRS resources. For example, four SRS resources and groups of two SRS resources may result in six SRS groups to cover each combination of the four SRS resources in groups of two. To continue the example, UE 115-b may be configured with a first SRS resource group that includes SRS resources 0 and 1, a second SRS resource group that includes SRS resources 0 and 2, a third SRS resource group that includes SRS resources 0 and 3, a fourth SRS resource group that includes SRS resources 1 and 2, a fifth SRS resource group that includes SRS resources 1 and 3, and a sixth SRS resource group that includes SRS resources 2 and 3.

A lookup table may include each group and a SRI bit sequence (e.g., an SRI bit sequence that is unique within the lookup table) associated with each group. The number of bits included in the SRI bit field may be based on the number of groups UE 115-b is configured with, where the number of bits within a table may be the same such that the same number of bits is used to indicate each SRS resource group within the table. For example, UE 115-a may be configured with six SRS groups that each have a unique identifier (e.g., SRI bit sequence). An SRI bit sequence including 3-bits may provide 6 different combination of bits to uniquely identifying each SRS resource group. Base station 105-a may transmit, to UE 115-b, one or more SRI bit fields via a control message 310, such as a DCI message, where the number of bits included in the SRI bit field may be the appropriate number of bits to uniquely indicate which SRS resource group within the configured table UE 115-b may use for codebook-based SRS transmissions.

In some cases, the configuration of the mapping (e.g., the lookup table(s) base station 105-b transmits to UE 115-b) may be based on the capability of UE 115-b. For example, prior to the mapping, UE 115-b may be configured or be requested to transmit the capability of UE 115-b to base station 105-b via one or more capability message. The capability message may indicate the antenna switching configuration UE 115-b is configured with (e.g., xTyR), such that UE 115-b may indicate the number of transmit and receive antennas UE 115-b may use for antenna switching SRS. The capability message may also include the number of ports UE 115-b may use for codebook-based SRS. In some cases, base station 105-b may gain this information from another source, such as another base station 105, or base station 105-b may configure UE 115-b with the antenna switching configuration (e.g., xTyR) and/or the codebook-base configuration (e.g., z ports) and may indicate such configurations to UE 115-b. As such, UE 115-b may not transmit a capability message to base station 105-b in such cases.

For example, UE 115-b may receive a configuration message from base station 105-b that indicates mapping between SRI bit fields and SRS resource groups. The configuration message may further indicate the SRS resources included in each SRS resource group. The configuration message may indicate that the first SRS resource group is associated with SRI 000, the second SRS resource group is associated with SRI 001, the third SRS resource group is associated with SRI 010, the fourth SRS resource group is associated with SRI 011, the fifth SRS resource group is associated with SRI 100, and the sixth SRS resource group is associated with SRI 101.

Upon receiving the configuration message, base station 105-b may transmit a control message 310 that includes at least one SRS bit field to indicate with which SRS resource group the transmitted precoding matric indicator (TPMI) is associated. For example, UE 115-b may receive a control message 310 that include an SRI bit sequence of 010. UE 115-b may use the information included in the configuration message, such as the lookup table, to determine that SRI bit sequence 010 is associated with the third SRS resource group. UE 115-b may further use information included in the configuration message to determine that the third SRS resource group includes SRS resource 0 and SRS resource 3, where SRS resources 0 and 3 may be included in the same SRS resource set or different SRS resource sets. As such, UE 115-b may use SRS resources 0 and 3 to transmit codebook-based SRS transmissions.

Tables 1 through 5 illustrate examples of lookup tables for various scenarios. The values included in Tables 1 through 5 are merely examples, such that the values and orders of the groups, the resources within a group, or the association between SRI bit sequence and SRS resources may be different and based on a preconfiguration or a configuration by a base station 105. For example, Table 1 may be an example lookup table for a UE 115 configured with a 1T4R antenna configuration for antenna switching SRS and two ports for codebook-based SRS, as described in the example depicted in FIG. 3. As such, the UE 115 may have four SRS resources to divide into groups of two resources, resulting in six SRS resources groups. In some cases, the UE 115 may transmit a capability message to the base station 105 indicating the number of transmit antennas and/or the number of receive antennas the UE 115 may support for antenna switching SRS and/or indicate the number of ports the UE 115 may support for codebook-based SRS. In some cases, UE 115 may receive the SRS configuration that includes one or more mapping tables and indicates a number of configured ports for antenna switching and a number of configured ports for uplink transmission, where the mapping between SRS resources (or SRS groups) is based on the number of configured ports for antenna switching and the number of configured ports for uplink transmission (e.g., codebook-based SRS). An SRI bit sequence including three bits may be utilized to distinguish between the six groups, where for example, an SRI bit sequence of 010 may indicate SRS resources 1 and 3.

TABLE 1

| 1T4R | |
|---|---|
| SRI bit field | z = 2, SRS resource ID |
| 000 | 0, 1 |
| 001 | 0, 2 |
| 010 | 0, 3 |
| 011 | 1, 2 |
| 100 | 1, 3 |
| 101 | 2, 3 |

Table 2 may be an example lookup table for a UE 115 configured with a 2T6R (e.g., x=2 and y=6) antenna configuration for antenna switching SRS and four ports (e.g., z=4) for codebook-based SRS. As such, the UE 115 may have three SRS resources (e.g., R=y/x, where 6/2 equals three SRS resources) to divide into groups of two resources (e.g., Nc=ceil(z/x), where ceil(4/2) equals two SRS resources), resulting in three SRS resources groups (e.g., $C_3^2$=3). The mapping between SRS resource groups and SRI bit sequences may be based on the capability of the UE 115, or based on a configuration message from the base station 105 that indicates the number of ports the UE 115 may use for antenna switching SRS and the number of ports the UE 115 may use for uplink transmission (e.g., codebook-based SRS), or a combination thereof. An SRI bit sequence including two bits may be utilized to distinguish between the three groups, where for example, an SRI bit sequence of 00 (or 0) may indicate SRS resources 0 and 1.

TABLE 2

| 2T6R | |
|---|---|
| SRI bit field | z = 4, SRS resource ID |
| 00 | 0, 1 |
| 01 | 0, 2 |
| 10 | 1, 2 |

Table 3 may be an example lookup table for a UE 115 configured with a 1T6R (e.g., x=1 and y=6) antenna configuration for antenna switching SRS and two ports or four ports (e.g., z=2 or z=4) for codebook-based SRS. In one case, the UE 115 may have six SRS resources (e.g., R=y/x, where 6/1 equals six SRS resources) to divide into groups of two resources for the case of two ports (e.g., Nc=ceil(z/x), where ceil(2/1) equals two SRS resources), resulting in fifteen SRS resources groups (e.g., $C_6^2$=15). In another case, the UE 115 may have six SRS resources (e.g., R=y/x, where 6/1 equals six SRS resources) to divide into groups of four resources for the case of four ports (e.g., Nc=ceil(z/x), where ceil(4/1) equals four SRS resources), resulting in fifteen SRS resources groups (e.g., $C_6^4$=15). In either case, an SRI bit sequence including four bits may be utilized to distinguish between the fifteen groups. Based on the capability of the UE 115 (e.g., the number of receive antennas, transmit antennas, and/or the number of ports the UE 115 is configured with) and signaling from the base station 105 (e.g., the base station may indicate the antenna and/or port configuration), the UE 115 may determine whether to use the two port or four port columns of the table. In some cases, Table 3 may be split into two different tables based on number of ports.

TABLE 3

| 1T6R | | | |
|---|---|---|---|
| SRI bit field | z = 2, SRS resource ID | SRI bit field | z = 4, SRS resource ID |
| 0000 | 0, 1 | 0000 | 0, 1, 2, 3 |
| 0001 | 0, 2 | 0001 | 0, 1, 2, 4 |
| 0010 | 0, 3 | 0010 | 0, 1, 2, 5 |
| 0011 | 0, 4 | 0011 | 0, 1, 3, 4 |
| ... | 0, 5 | ... | ... |
|  | 1, 2 |  |  |
|  | 1, 3 |  |  |
| ... | ... | ... | ... |
| 1110 | 4, 5 | 1110 | 2, 3, 4, 5 |

Table 4 may be an example lookup table for a UE 115 configured with a 2T8R (e.g., x=2 and y=8) antenna configuration for antenna switching SRS and four ports (e.g., z=4) for codebook-based SRS. As such, the UE 115 may have four SRS resources (e.g., R=y/x, where 8/2 equals four SRS resources) to divide into groups of two resources (e.g., Nc=ceil(z/x), where ceil(4/2) equals two SRS resources), resulting in six SRS resources groups (e.g., $C_4^2$=6). The mapping between SRS resource groups and SRI bit sequences may be based on the capability of the UE 115, or based on a configuration message from the base station 105 that indicates the number of ports the UE 115 may use for antenna switching SRS and the number of ports the UE 115 may use for uplink transmission (e.g., codebook-based SRS), or a combination thereof. An SRI bit sequence including three bits may be utilized to distinguish between the six groups.

TABLE 4

| 2T8R | |
|---|---|
| SRI bit field | z = 4, SRS resource ID |
| 000 | 0, 1 |
| 001 | 0, 2 |
| 010 | 0, 3 |
| 011 | 1, 2 |
| 100 | 1, 3 |
| 101 | 2, 3 |

Table 5 may be an example lookup table for a UE 115 configured with a 1T8R (e.g., x=1 and y=8) antenna configuration for antenna switching SRS and two ports or four ports (e.g., z=2 or z=4) for codebook-based SRS. In one case, the UE 115 may have eight SRS resources (e.g., R=y/x, where 8/1 equals eight SRS resources) to divide into groups of two resources for the case of two ports (e.g., Nc=ceil(z/x), where ceil(2/1) equals two SRS resources), resulting in 28 SRS resources groups (e.g., $C_8^2$=28). In this case, an SRI bit sequence including five bits may be utilized to distinguish between the 28 groups. In another case, the UE 115 may have eight SRS resources (e.g., R=y/x, where 8/1 equals eight SRS resources) to divide into groups of four resources for the case of four ports (e.g., Nc=ceil(z/x), where ceil(4/1) equals four SRS resources), resulting in 70 SRS resources groups (e.g., $C_8^4$=70). In this case, an SRI bit sequence including seven bits may be utilized to distinguish between the 70 groups. Based on the capability of the UE 115 (e.g., the number of receive antennas, transmit antennas, and/or the number of ports the UE 115 is configured with) and signaling from the base station 105 (e.g., the base station may indicate the antenna and/or port configuration), the UE 115 may determine whether to use the two port or four port columns of the table. In some cases, Table 5 may be split into two different tables based on number of ports.

TABLE 5

| 1T8R | | | |
|---|---|---|---|
| SRI bit field | z = 2, SRS resource ID | SRI bit field | z = 4, SRS resource ID |
| 00000 | 0, 1 | 0000000 | 0, 1, 2, 3 |
| 00001 | 0, 2 | 0000001 | 0, 1, 2, 4 |
| 00010 | 0, 3 | 0000010 | 0, 1, 2, 5 |
| 00011 | 0, 4 | 0000011 | 0, 1, 2, 6 |
| 00100 | 0, 5 | 0000100 | 0, 1, 2, 7 |
| 00101 | 0, 6 | 0000101 | 0, 1, 3, 4 |
| 00110 | 0, 7 | 0000110 | 0, 1, 3, 5 |
| . . . | . . . | 0000111 | 0, 1, 3, 6 |
| 11011 | 6, 7 | 0001000 | 0, 1, 3, 7 |
| | | . . . | . . . |
| | | 1000101 | 4, 5, 6, 7 |

Figure 4:
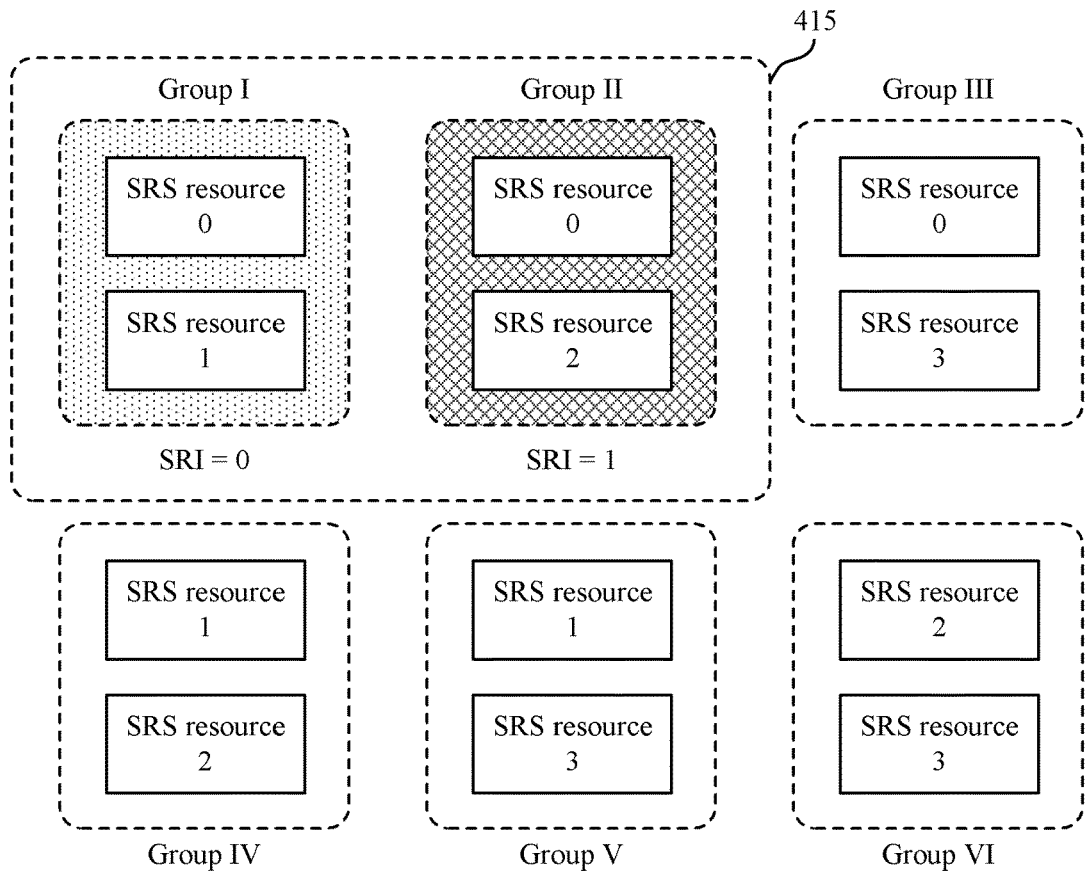
Figure 4:
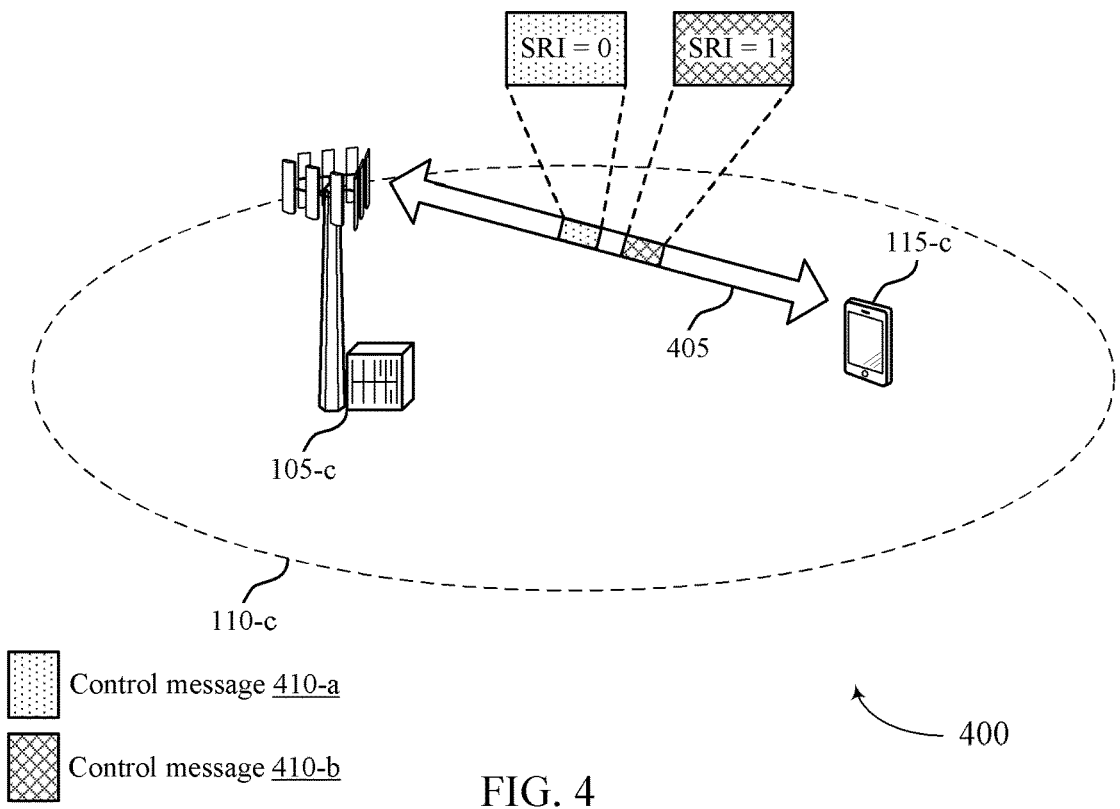

FIG. 4 illustrates an example of a wireless communications system 400 that supports techniques for indicating SRS resources in accordance with aspects of the present disclosure. The wireless communications system 400 may include base station 105-c and UE 115-c, which may be examples of a base station 105 and a UE 115 as described with reference to FIGS. 1 through 3. Base station 105-c may serve a geographic coverage area 110-c. In some cases, base station 105-c may implement an SRS resource indication procedure. For example, base station 105-c may indicate, to UE 115-c, one or more SRS resources for UE 115-c to use to transmit SRS transmissions to base station 105-c. Additionally or alternatively, other wireless devices, such a UE 115 or base station 105, may implement the SRS resource indication procedure and/or receive the SRS indication.

As described herein, UE 115-c may communicate with base station 105-c via one or more communication links 405. For example, base station 105-c may transmit control messages 410 and/or configuration messages, such as SRS configuration messages, to UE 115-c via communication link 405, which may be a downlink communications link. UE 115-c may transmit one or more uplink transmissions, such as reference signals (e.g., SRSs) in uplink configured resources (e.g., SRS resources) to base station 105-c via communication link 405, which may be an uplink communications link.

As described with reference to FIG. 3, a UE 115 may receive an SRS configuration such as a lookup table or mapping that provides an association between SRS resources and SRI bit sequences, where an SRI may be configured to include one, two, or more bits. In the examples described with reference to FIG. 3, SRS resources may be grouped such that single SRS bit sequence may indicate one SRS resource group that includes multiple SRS resources. The more groups the UE 115 is configured with, the more SRI bits to be included in the SRI bit sequence. In some cases, SRS resources groups may be down-selected to reduce SRI overhead.

In some cases, UE 115-c may be configured with all groups, such as according to the examples described with reference to FIG. 3. Base station 105-c may select a subset of the SRS resource groups from the full set of SRS resources group and may transmit an indication of the subset 415 to UE 115-c via a control message 410 aperiodically or semi-persistently, such as through RRC or MAC-CE signaling. For example, UE 115-c may receive the indication of the subset 415 via a DCI message (e.g., dynamically) that indicates the change to the subset 415 with the same slot index as the SRS transmissions. In some cases, the indication of the subset 415 may be included in a configuration message and in some cases, the configuration message may include both the full set of groups and mapping associated with the full set and the indication of the subset 415 of groups. In some cases, UE 115-c may receive the full set and the subset 415 in two different configuration messages. For example, UE 115-c may be originally configured with the full set of SRS groups and may perform SRS transmissions based on the full set configuration. UE 115-c may the receive the indication of the subset 415 and use the subset 415 for SRS transmissions. In some cases, UE 115-c may receive the full set and the subset 415 in the same of different configuration messages and UE 115-c may store the mappings and information associated with the full set and subset 415. UE 115-c may then receive messages from base station 105-c aperiodically, semi-persistency, or dynamically (e.g., via RRC, MAC-CE, or DCI) that indicate whether UE 115-c should use the full set or subset 415 for SRS transmissions.

In some cases, the UE 115 may transmit a capability message to the base station 105 indicating the number of transmit antennas and/or the number of receive antennas the UE 115 may support for antenna switching SRS and/or indicate the number of ports the UE 115 may support for codebook-based SRS. In some cases, UE 115 may receive the SRS configuration that includes one or more mapping tables and indicates a number of configured ports for antenna switching and a number of configured ports for uplink transmission, where the mapping between SRS resources (or SRS groups) is based on the number of configured ports for antenna switching and the number of configured ports for uplink transmission (e.g., codebook-based SRS).

As depicted in FIG. 4, UE 115-c may be configured with a 1T4R antenna configuration for antenna switching SRS and two ports for codebook-based SRS, as described in the example depicted in FIG. 3. As such, the UE 115 may have four SRS resources to divide into groups of two resources, resulting in six SRS resources groups. An SRI bit sequence including three bits may be utilized to distinguish between the six groups (e.g., Groups I through VI). Base station 105-c may determine to down-select to two groups of the six groups. For example, base station 105-c may select subset 415 that includes Group I and Group II. As the number of groups that have to be distinguishable by an SRI bit sequence is lowered, the number of bits included in the SRI bit sequence is lowered. For example, to distinguish between the original six groups, base station 105-c had to include three bits in the SRI bit sequence. However, with just two groups to distinguish, the SRI bit sequence may include just one bit. As such, the configuration message 410 that includes the indication of the subset 415 may also include the mapping associated with subset 415 such that each group in the subset 415 is mapped to an SRI bit sequence. For example, UE 115-c may receive a mapping that indicates Group I of subset 415 is mapped to SRI bit sequence 0 and Group II of subset 415 is mapped to SRI bit sequence 1. The number of groups included in the down-select subset 415 is not limited, such that base station 105-c may select any number of groups from the full set to be included in the subset 415. Further, base station 105-c may select the groups to be included in the subset 415 in any order such that the groups included in the subset 415 may be from any location within the full set.

As such, upon receiving an indication of the subset 415 and the mapping associated with the subset 415, UE 115-c may receive a first control message 410-a from base station 105-c that includes an SRI bit sequence of 0. UE 115-c may determine to use the SRS resources (e.g., SRS resources 0 and 1) within Group I for SRS transmissions (e.g., codebook-based SRS) based on the SRI bit sequence and the indicated mapping. In another example, UE 115-c may receive a second control message 410-b from base station 105-c that includes an SRI bit sequence of 1. UE 115-c may determine to use the SRS resources (e.g., SRS resources 0 and 2) within Group II for SRS transmissions (e.g., codebook-based SRS) based on the SRI bit sequence and the indicated mapping.

Tables 6 and 7 may indicate another example of down-selecting. UE 115-c may be configured with 1T8R for antenna switching and two ports for codebook-based SRS. As such, base station 105-c may configure UE 115-c with an SRS resource group configuration according to Table 6 that includes 28 groups, and five bits are utilized to differentiate the groups. Base station 105-c may determine to down-select a subset of 8 groups from the set of 28. Base station 105-c may select any 8 groups within the 28, where the selection of the subset may be based on available resources, etc. In the example depicted in Table 7, base station 105-c may select the first 8 groups from Table 6. As such, base station 105-c may differentiate between eight groups, rather than 28, and base station 105-c may use a 3-bit SRI bit sequence rather than a 5-bit SRI bit sequence. Thus, SRI overhead may be reduced. The new bit sequences (e.g., the subset bit sequences) may be based on the original bit sequences (e.g., the full set sequences).

TABLE 6

| 1T8R | |
|---|---|
| SRI bit field | z = 2, SRS resource ID |
| 00000 | 0, 1 |
| 00001 | 0, 2 |
| 00010 | 0, 3 |
| 00011 | 0, 4 |
| 00100 | 0, 5 |
| 00101 | 0, 6 |
| 00110 | 0, 7 |
| 00111 | 1, 7 |
| . . . | . . . |
| . . . | . . . |
| 11011 | 6, 7 |

TABLE 7

| 1T8R | |
|---|---|
| SRI bit field | z = 2, SRS resource ID |
| 000 | 0, 1 |
| 001 | 0, 2 |
| 010 | 0, 3 |
| 011 | 0, 4 |
| 100 | 0, 5 |
| 101 | 0, 6 |
| 110 | 0, 7 |
| 111 | 1, 2 |

Figure 5:
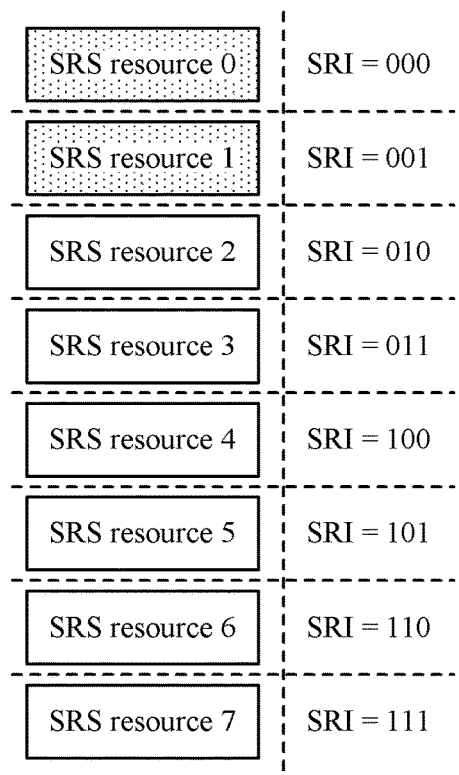
Figure 5:
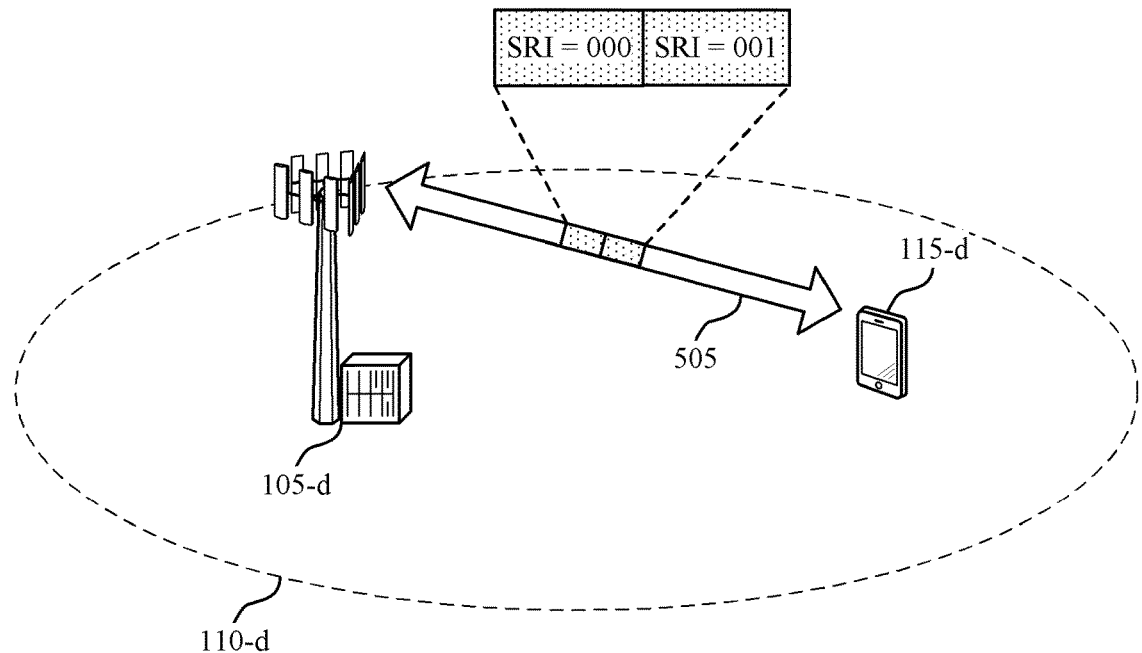
Figure 5:

FIG. 5 illustrates an example of a wireless communications system 500 that supports techniques for indicating SRS resources in accordance with aspects of the present disclosure. The wireless communications system 500 may include base station 105-d and UE 115-d, which may be examples of a base station 105 and a UE 115 as described with reference to FIGS. 1 through 4. Base station 105-d may serve a geographic coverage area 110-d. In some cases, base station 105-d may implement an SRS resource indication procedure. For example, base station 105-d may indicate, to UE 115-d, one or more SRS resources for UE 115-d to use to transmit SRS transmissions to base station 105-d. Additionally or alternatively, other wireless devices, such a UE 115 or base station 105, may implement the SRS resource indication procedure and/or receive the SRS indication.

As described herein, UE 115-d may communicate with base station 105-d via one or more communication links 505. For example, base station 105-d may transmit control signals and/or configuration messages, such as SRS configuration messages, to UE 115-d via communication link 505, which may be a downlink communications link. UE 115-d may transmit one or more uplink transmissions, such as reference signals (e.g., SRSs) in uplink configured resources (e.g., SRS resources) to base station 105-d via communication link 505, which may be an uplink communications link.

In some implementations, rather than configuring a mapping between SRS resource groups and SRI bit sequences as described with reference to FIGS. 3 and 4, a base station 105 may configure a mapping between individual SRS resources and SRI bit sequences. The number of bits included in each SRI bit sequence of the mapping may be based on the number of SRS resources a UE 115 is configured with for antenna switching. For example, UE 115-d may be configured with a 1T8R antenna configuration for antenna switching SRS. As such, UE 115-d may have eight SRS resources (e.g., SRS resources 0 through 7) to use for antenna switching SRS and/or codebook-based SRS and base station 105-d have eight SRS resources to distinguish via an SRI bit sequence. A 3-bit bit sequence may be utilized to associated a unique bit sequence with each SRS resource.

Base station 105-c may transmit the configuration, such as the lookup table including the mappings between SRS resources and the 3-bit SRI bit sequences, to UE 115-d aperiodically or semi-statically via a control message 510 such as an RRC message. Base station 105-d may then transmit another control message, such as a DCI message, to UE 115-d that includes an SRI bit sequence. UE 115-d may identify the SRI bit sequence and use the configured lookup table to determine which SRS resource is associated with the identified SRI bit sequence. In some cases, the control message may include multiple SRI bit sequences to indicate multiple SRS resources. For example, the control message 510 may include SRI bit sequence 000 and SRI bit sequence 001. UE 115-d may determine that SRI bit sequence 000 is associated with SRS resource 0 and SRI bit sequence 001 is associated with SRS resource 1. As such, UE 115-b may use SRS resources 0 and 1 to transmit codebook-based SRS transmissions. In some cases, base station 105-d may configure up to three SRS resources for codebook-based SRS transmissions to mitigate the number of SRI bit sequences, and thus the number of bits that are included in the control message 510.

In some implementations, base station 105-c may select a subset of the full set of SRS resources to further mitigate SRI overhead. For example, base station 105-c may select and configure a mapping of up to three SRS resources of the eight SRS resources. As such, less bit may be utilized in the SRI bit sequences to distinguish the SRS resources.

In some cases, the UE 115 may transmit a capability message to the base station 105 indicating the number of transmit antennas and/or the number of receive antennas the UE 115 may support for antenna switching SRS and/or indicate the number of ports the UE 115 may support for codebook-based SRS. In some cases, UE 115 may receive the SRS configuration that includes one or more mapping tables and indicates a number of configured ports for antenna switching and a number of configured ports for uplink transmission, where the mapping between SRS resources (or SRS groups) is based on the number of configured ports for antenna switching and the number of configured ports for uplink transmission (e.g., codebook-based SRS).

Figure 6:
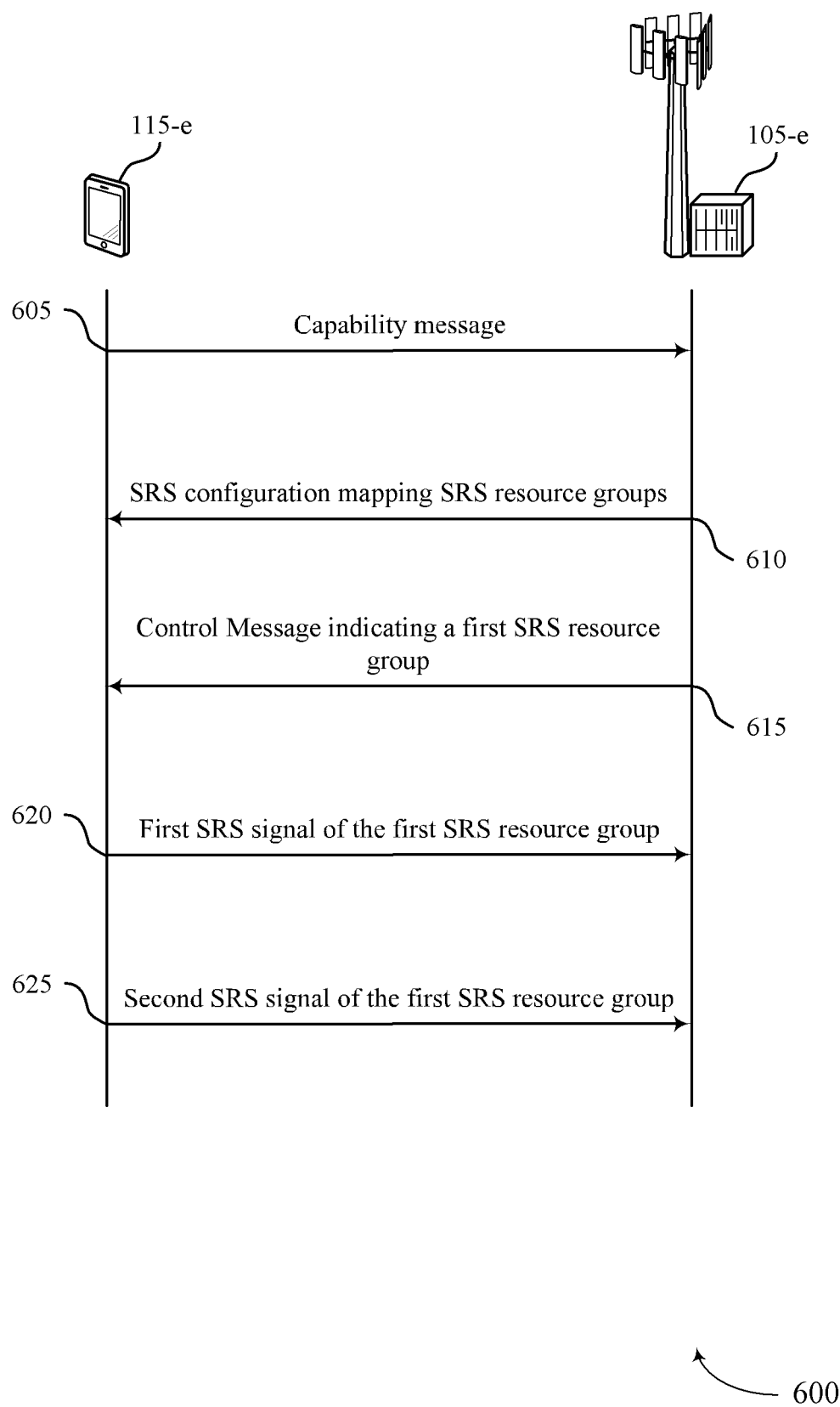
FIGS. 6 and 7 illustrate examples of process flows that support techniques for indicating SRS resources in accordance with aspects of the present disclosure.

FIG. 6 illustrates an example of a process flow 600 that supports techniques for indicating SRS resources in accordance with aspects of the present disclosure. The process flow 600 may illustrate an example SRS indication and SRS transmission procedure. For example, base station 105-e may indicate, to UE 115-e, one or more SRS resources for UE 115-e to use to transmit SRS transmissions to base station 105-e. Base station 105-e and UE 115-e may be examples of the corresponding wireless devices described with reference to FIGS. 1 through 5. In some cases, instead of base station 105-e implementing the SRS indication procedure, a different type of wireless device (e.g., a UE 115, or other network device) may indicate the SRS resources and/or perform the SRS transmission procedure. Alternative examples of the following may be implemented, where some operations are performed in a different order than described or are not performed at all. In some cases, operations may include additional features not mentioned below, or further operations may be added.

At 605, UE 115-e may transmit, to base station 105-e, a capability message indicating a first number of one or more transmit antennas supported by the UE for antenna switching and a second number of ports supported for uplink transmission that exceeds the first number of one or more transmit antennas. In some implementations, UE 115-e may transmit the capability message indicating a third number of one or more receive antennas supported for antenna switching, the SRS configuration based at least in part on the third number of receive antennas supported for antenna switching. The third number of one or more receive antennas may exceed the first number of one or more transmit antennas. Based on the capability message, the base station 105-b may determine the number of resource sets, and the number of SRS resource groups, to use for SRS sounding for antenna switching and SRS codebook based sounding, and may determine the mapping between SRI bit sequences and SRS resource groups.

At 610, UE 115-e may receive, to base station 105-e, based at least in part on the capability message, a SRS configuration indicating a mapping between each SRS resource group for at least a subset of a plurality of SRS resource groups and a respective bit sequence of a plurality of bit sequences. In some cases, UE 115-e may receive the SRS configuration indicating a mapping table that indicates the mapping between each SRS resource group for at least the subset of the plurality of SRS resource groups and the respective bit sequence of the plurality of bit sequences. In some cases, UE 115-e may receive the SRS configuration indicating a number of configured ports for antenna switching and a number of configured ports for uplink transmission, wherein the mapping is based at least in part on the number of configured ports for antenna switching and the number of configured ports for uplink transmission (e.g., codebook-based SRS). In some cases, UE 115-e may receive the SRS configuration indicating a mapping between each SRS group of the plurality of SRS resource groups and a respective bit sequence of the plurality of bit sequences. For example, UE 115-e may receive a configuration message from base station 105-e that indicates a mapping table such as Tables 1 through 7 as described with reference to FIGS. 3 and 4, where the mapping tables may be based on the configuration of the UE 115 and/or based on a configuration message from base station 105-e that indicates the number of ports base station 105-e has allocated to UE 115-e for antenna switching SRS and the number of ports base station 105-e has allocated to UE 115-e for codebook-based SRS.

In some cases, UE 115-e may receive the SRS configuration indicating a codebook SRS configuration. Each SRS resource group may include a single SRS resource of the SRS resource group. Each bit sequence of the plurality of bit sequences may include a single bit.

At 615, UE 115-e may receive, from base station 105-e, a control message comprising a first bit sequence of the plurality of bit sequences indicating a first SRS resource group of the subset of the plurality of SRS resource groups based at least in part on the mapping. In some cases, UE 115-*e* may receive a downlink control information message comprising the first bit sequence.

At 620, UE 115-*e* may transmit, to base station 105-*e*, a first SRS in a first SRS resource of the first SRS resource group based at least in part on the control message.

At 625, UE 115-*e* may transmit, to base station 105-*e*, a second SRS in a second SRS resource of the first SRS resource group based at least in part on the control message.

Figure 7:
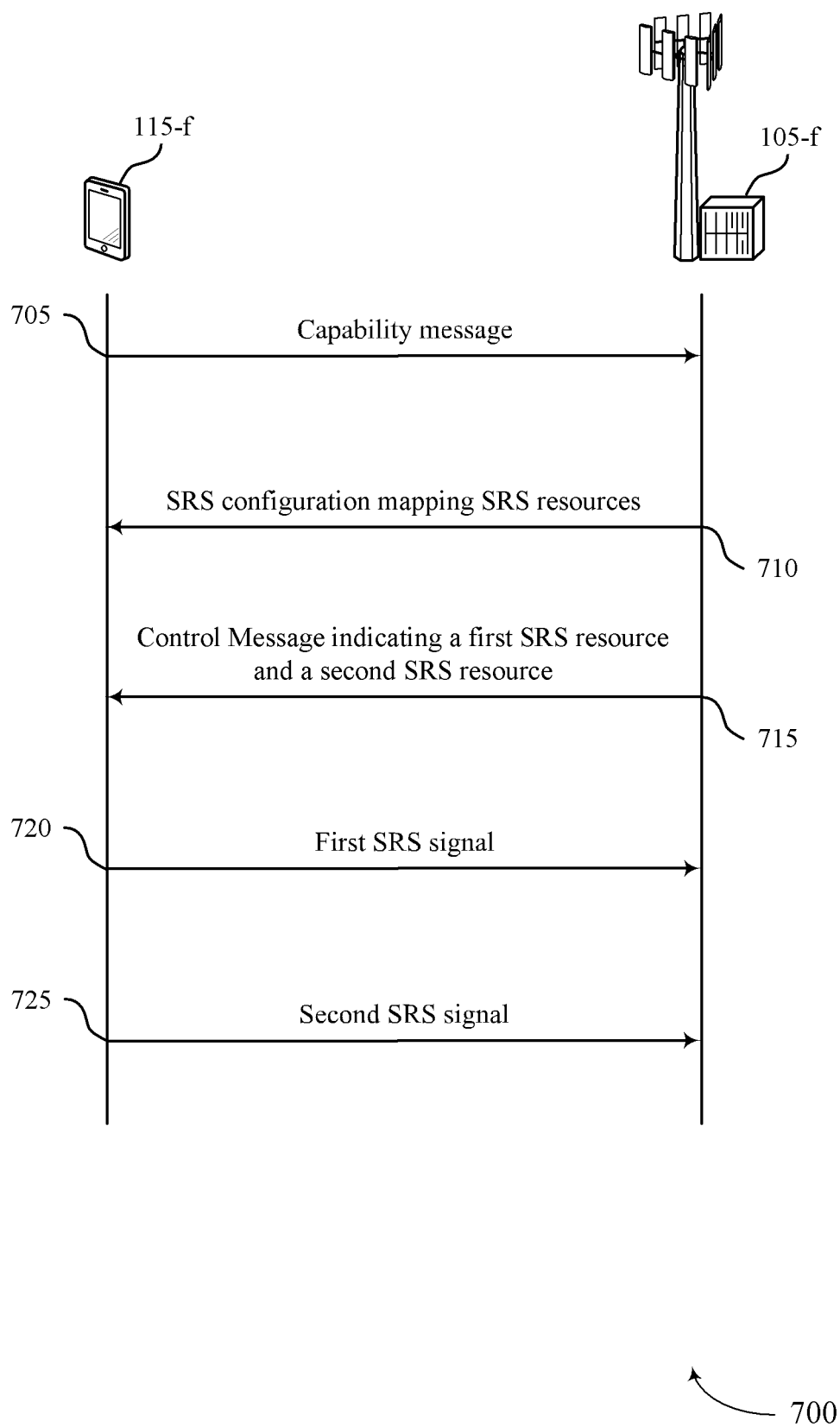

FIG. 7 illustrates an example of a process flow 700 that supports techniques for indicating SRS resources in accordance with aspects of the present disclosure. The process flow 700 may illustrate an example SRS indication and SRS transmission procedure. For example, base station 105-*f* may indicate, to UE 115-*f*, one or more SRS resources for UE 115-*f* to use to transmit SRS transmissions to base station 105-*f*. Base station 105-*f* and UE 115-*f* may be examples of the corresponding wireless devices described with reference to FIGS. 1 through 6. In some cases, instead of base station 105-*f* implementing the SRS indication procedure, a different type of wireless device (e.g., a UE 115, or other network device) may indicate the SRS resources and/or perform the SRS transmission procedure. Alternative examples of the following may be implemented, where some operations are performed in a different order than described or are not performed at all. In some cases, operations may include additional features not mentioned below, or further operations may be added.

At 705, UE 115-*f* may transmit, to base station 105-*f*, a capability message indicating a first number of one or more transmit antennas supported by the UE for antenna switching and a second number of ports supported for uplink transmission that exceeds the first number of transmit antennas. In some implementations, UE 115-*f* may transmit the capability message indicating a third number of one or more receive antennas supported for antenna switching, the SRS configuration based at least in part on the third number of receive antennas supported for antenna switching. The third number of one or more receive antennas may exceed the first number of one or more transmit antennas. Based on the capability message, the base station 105-*b* may determine the number of resource sets, and the number of SRS resource groups, to use for SRS sounding for antenna switching and SRS codebook based sounding, and may determine the mapping between SRI bit sequences and SRS resource groups.

At 710, UE 115-*f* may receive, from base station 105-*f*, based at least in part on the capability message, a SRS configuration indicating a mapping between each SRS resource of a plurality of SRS resources and a respective bit sequence of a plurality of bit sequences. In some cases, UE 115-*f* may receive the SRS configuration indicating a codebook SRS configuration. In some cases, UE 115-*f* may receive the SRS configuration indicating a mapping table corresponding to the mapping, wherein the respective bit sequences indicates respective indexes to the mapping table. For example, UE 115-*f* may receive a configuration message from base station 105-*f* that indicates a mapping table such as the table described with reference to FIG. 5, where the mapping table may be based on the configuration of the UE 115 and/or based on a configuration message from base station 105-*f* that indicates the number of ports base station 105-*f* has allocated to UE 115-*f* for antenna switching SRS and the number of ports base station 105-*f* has allocated to UE 115-*f* for codebook-based SRS.

At 715, UE 115-*f* may receive, from base station 105-*f*, a control message comprising a first bit sequence of the plurality of bit sequences indicating a first SRS resource of the plurality of SRS resources and a second bit sequence of the plurality of bit sequences indicating a second SRS resource of the plurality of SRS resources based at least in part on the mapping. In some cases, UE 115-*c* may receive a downlink control information message comprising the first bit sequence and the second bit sequence.

At 720, UE 115-*f* may transmit, to base station 105-*f*, a first SRS in the first SRS resource based at least in part on the first bit sequence indicated in the control message.

At 725, UE 115-*f* may transmit, to base station 105-*f*, a second SRS in the second SRS resource based at least in part on the second bit sequence indicated in the control message.

Figure 8:
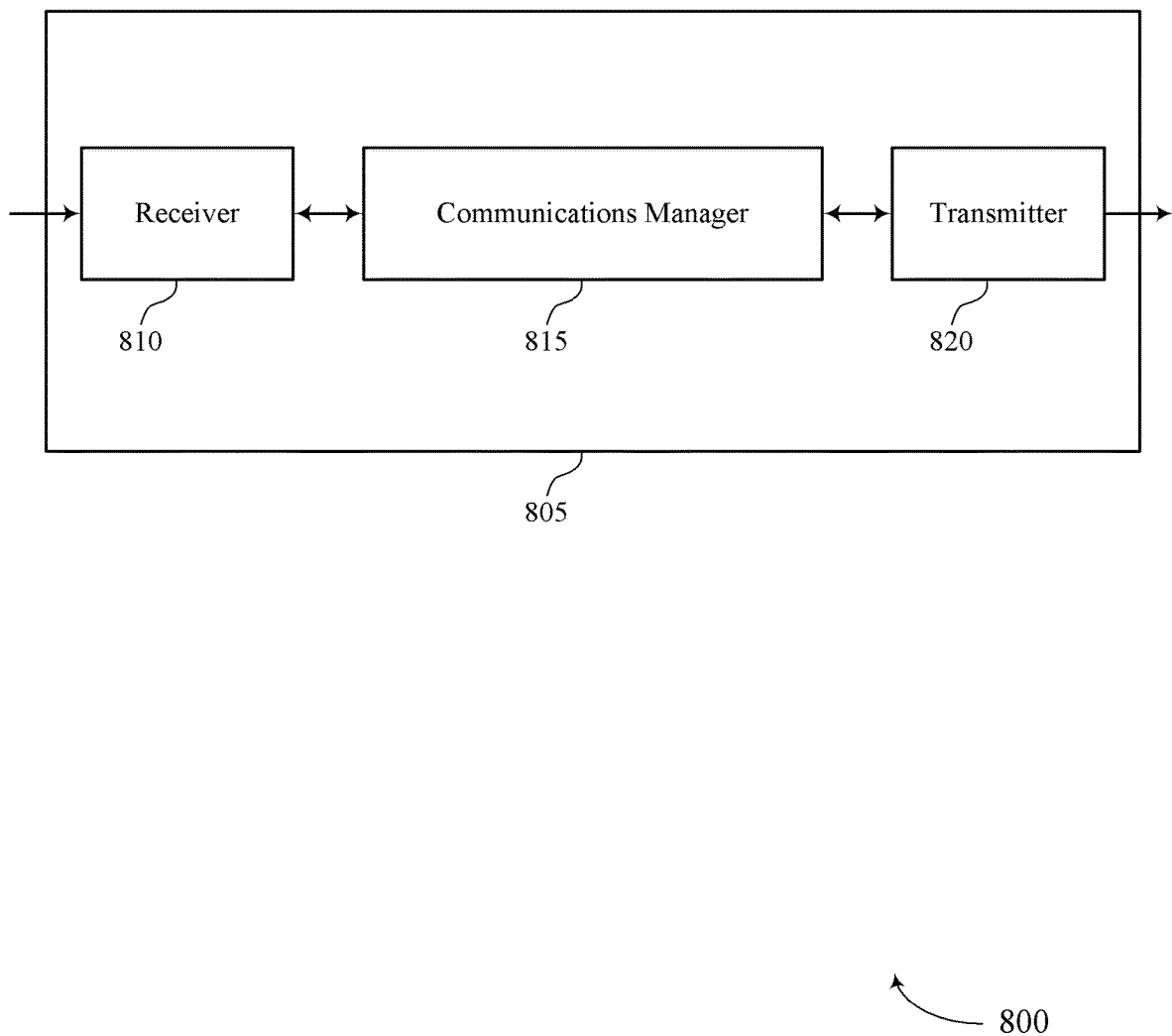
FIGS. 8 and 9 show block diagrams of devices that support techniques for indicating SRS resources in accordance with aspects of the present disclosure.

FIG. 8 shows a block diagram 800 of a device 805 that supports techniques for indicating SRS resources in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for indicating SRS resources, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit a capability message indicating a first number of one or more transmit antennas supported by the UE for antenna switching and a second number of ports supported for uplink transmission that exceeds the first number of one or more transmit antennas, receive, based on the capability message, a SRS configuration indicating a mapping between each SRS resource group for at least a subset of a set of SRS resource groups and a respective bit sequence of a set of bit sequences, receive a control message including a first bit sequence of the set of bit sequences indicating a first SRS resource group of the subset of the set of SRS resource groups based on the mapping, transmit a first SRS in a first SRS resource of the first SRS resource group based on the control message, and transmit a second SRS in a second SRS resource of the first SRS resource group based on the control message. The communications manager 815 may also transmit a capability message indicating a first number of one or more transmit antennas supported by the UE for antenna switching and a second number of ports supported for uplink transmission that exceeds the first number of transmit antennas, receive, based on the capability message, a SRS configuration indicating a mapping between each SRS resource of a set of SRS resources and a respective bit sequence of a set of bit sequences, receive a control message including a first bit sequence of the set of bit sequences indicating a first SRS resource of the set of SRS resources and a second bit sequence of the set of bit sequences indicating a second SRS resource of the set of SRS resources based on the mapping, transmit a first SRS in the first SRS resource based on the first bit sequence indicated in the control message, and transmit a second SRS in the second SRS resource based on the second bit sequence indicated in the control message. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The communications manager 815 as described herein may be implemented to realize one or more potential advantages. One implementation may allow the device 805 to more efficiently schedule SRS transmission to be transmitted by the device 805. For example, a device 805 be configured with a single SRS resource set that may be used for multiple different SRS use cases, and the device 805 may receive reliable indications of which SRS resources to use within the SRS resource set for certain SRS transmissions (e.g., for certain SRS use cases).

Based on implementing the SRS configuration and transmission techniques as described herein, a processor of a UE 115 (e.g., controlling the receiver 810, the transmitter 820, or the transceiver 1120 as described with reference to FIG. 11) may increase reliability and efficiency in the communication reference signals between a UE 115 and one or more base stations and the determination of channel properties based on the reference signals.

Figure 9:
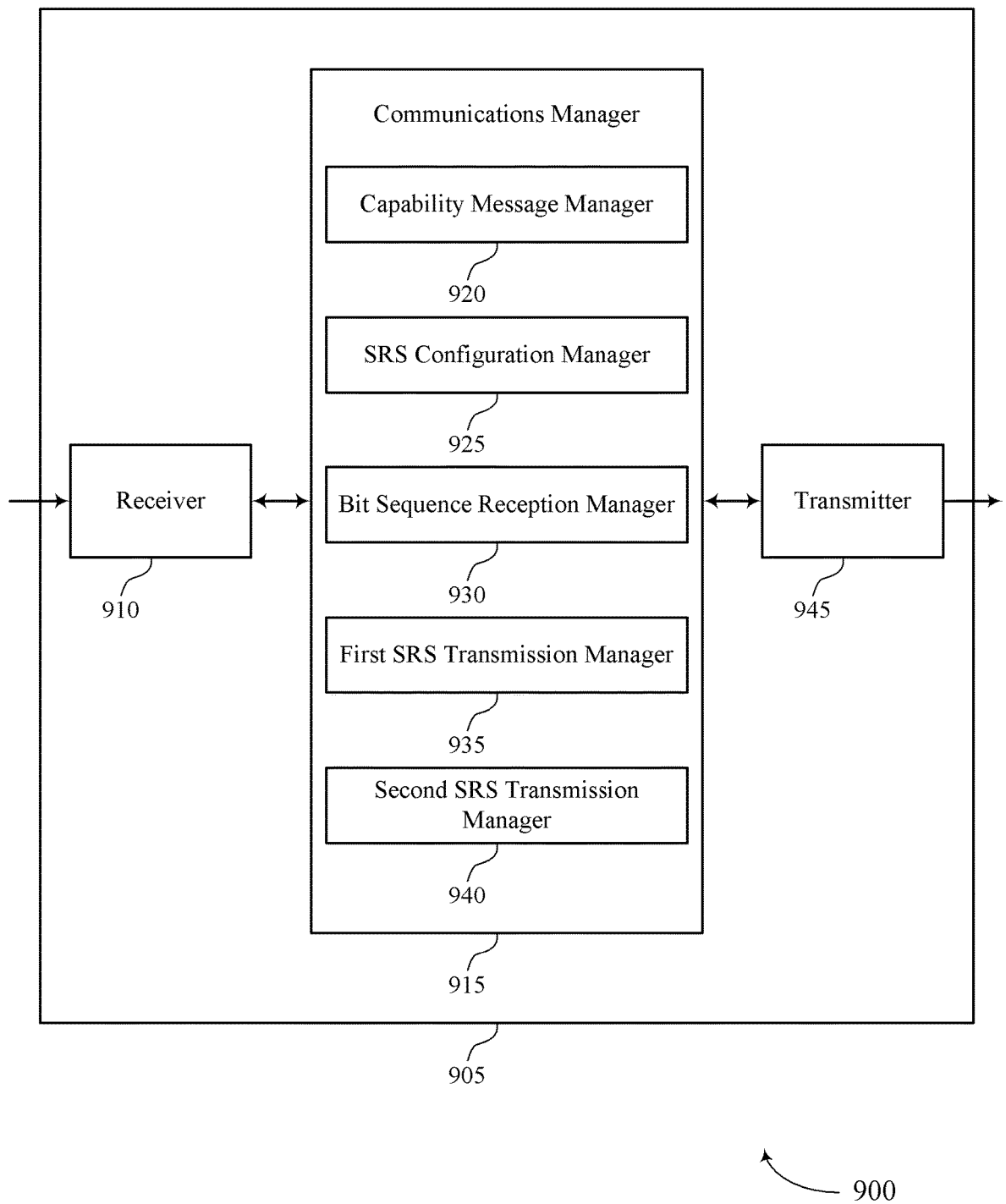

FIG. 9 shows a block diagram 900 of a device 905 that supports techniques for indicating SRS resources in accordance with aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to techniques for indicating SRS resources, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a capability message manager 920, a SRS configuration manager 925, a bit sequence reception manager 930, a first SRS transmission manager 935, and a second SRS transmission manager 940. The communications manager 915 may be an example of aspects of the communications manager 1110 described herein.

The capability message manager 920 may transmit a capability message indicating a first number of one or more transmit antennas supported by the UE for antenna switching and a second number of ports supported for uplink transmission that exceeds the first number of one or more transmit antennas. The SRS configuration manager 925 may receive, based on the capability message, a SRS configuration indicating a mapping between each SRS resource group for at least a subset of a set of SRS resource groups and a respective bit sequence of a set of bit sequences. The bit sequence reception manager 930 may receive a control message including a first bit sequence of the set of bit sequences indicating a first SRS resource group of the subset of the set of SRS resource groups based on the mapping. The first SRS transmission manager 935 may transmit a first SRS in a first SRS resource of the first SRS resource group based on the control message. The second SRS transmission manager 940 may transmit a second SRS in a second SRS resource of the first SRS resource group based on the control message.

The capability message manager 920 may transmit a capability message indicating a first number of one or more transmit antennas supported by the UE for antenna switching and a second number of ports supported for uplink transmission that exceeds the first number of transmit antennas. The SRS configuration manager 925 may receive, based on the capability message, a SRS configuration indicating a mapping between each SRS resource of a set of SRS resources and a respective bit sequence of a set of bit sequences. The bit sequence reception manager 930 may receive a control message including a first bit sequence of the set of bit sequences indicating a first SRS resource of the set of SRS resources and a second bit sequence of the set of bit sequences indicating a second SRS resource of the set of SRS resources based on the mapping. The first SRS transmission manager 935 may transmit a first SRS in the first SRS resource based on the first bit sequence indicated in the control message. The second SRS transmission manager 940 may transmit a second SRS in the second SRS resource based on the second bit sequence indicated in the control message.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
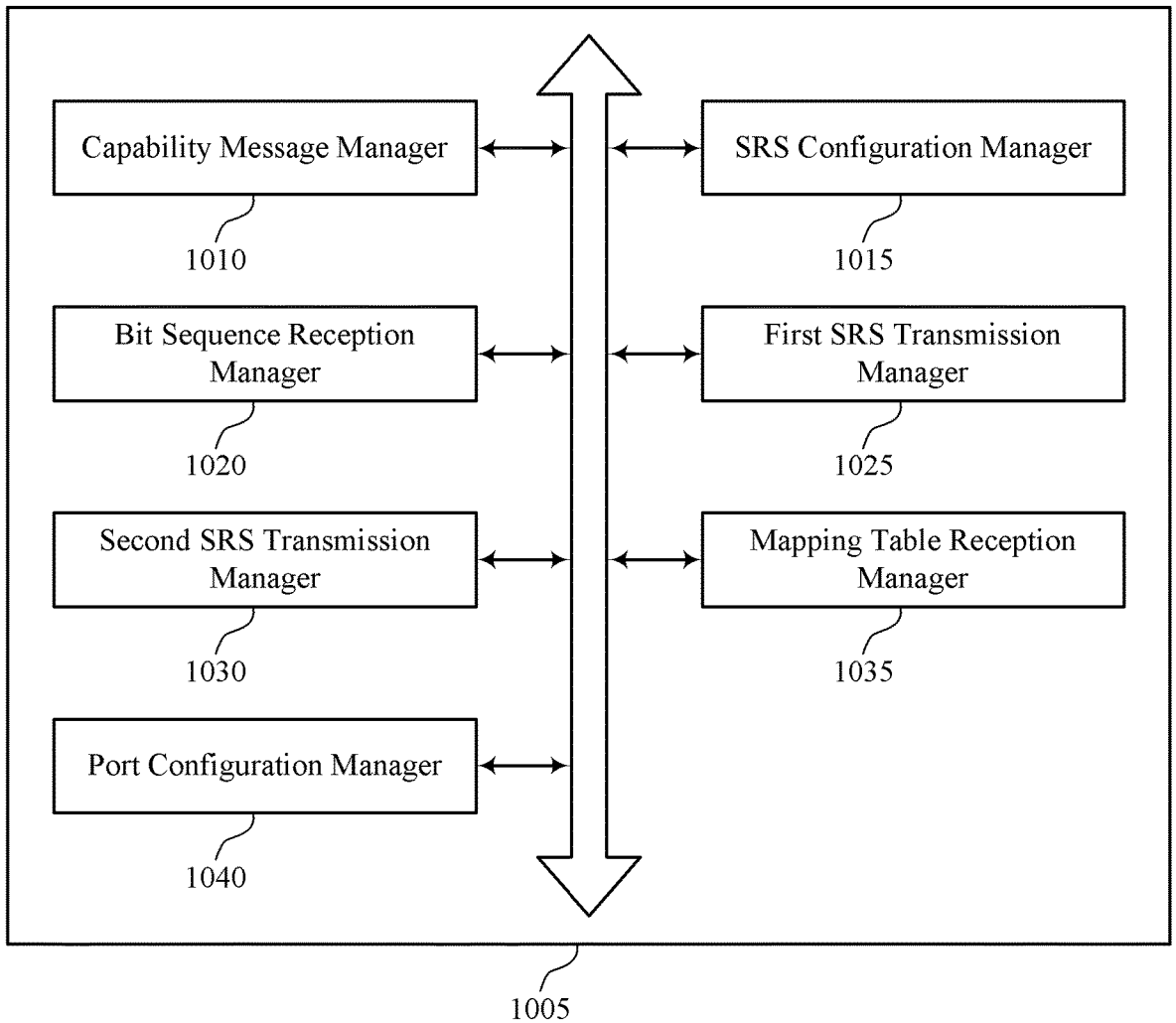
FIG. 10 shows a block diagram of a communications manager that supports techniques for indicating SRS resources in accordance with aspects of the present disclosure.

FIG. 10 shows a block diagram 1000 of a communications manager 1005 that supports techniques for indicating SRS resources in accordance with aspects of the present disclosure. The communications manager 1005 may be an example of aspects of a communications manager 815, a communications manager 915, or a communications manager 1110 described herein. The communications manager 1005 may include a capability message manager 1010, a SRS configuration manager 1015, a bit sequence reception manager 1020, a first SRS transmission manager 1025, a second SRS transmission manager 1030, a mapping table reception manager 1035, and a port configuration manager 1040. Each of these modules may communicate, directly or indirectly, with one another (e.g., via one or more buses).

The capability message manager 1010 may transmit a capability message indicating a first number of one or more transmit antennas supported by the UE for antenna switching and a second number of ports supported for uplink transmission that exceeds the first number of one or more transmit antennas. The SRS configuration manager 1015 may receive, based on the capability message, a SRS configuration indicating a mapping between each SRS resource group for at least a subset of a set of SRS resource groups and a respective bit sequence of a set of bit sequences. The bit sequence reception manager 1020 may receive a control message including a first bit sequence of the set of bit sequences indicating a first SRS resource group of the subset of the set of SRS resource groups based on the mapping. The first SRS transmission manager 1025 may transmit a first SRS in a first SRS resource of the first SRS resource group based on the control message. The second SRS transmission manager 1030 may transmit a second SRS in a second SRS resource of the first SRS resource group based on the control message.

The mapping table reception manager 1035 may receive the SRS configuration indicating a mapping table that indicates the mapping between each SRS resource group for at least the subset of the set of SRS resource groups and the respective bit sequence of the set of bit sequences. The port configuration manager 1040 may receive the SRS configuration indicating a number of configured ports for antenna switching and a number of configured ports for uplink transmission, where the mapping is based on the number of configured ports for antenna switching and the number of configured ports for uplink transmission.

In some examples, the SRS configuration manager 1015 may receive the SRS configuration indicating a mapping between each SRS group of the set of SRS resource groups and a respective bit sequence of the set of bit sequences.

In some examples, the capability message manager 1010 may transmit the capability message indicating a third number of one or more receive antennas supported for antenna switching, the SRS configuration based on the third number of receive antennas supported for antenna switching. In some cases, the third number of one or more receive antennas exceeds the first number of one or more transmit antennas.

In some examples, the bit sequence reception manager 1020 may receive a downlink control information message including the first bit sequence. In some cases, each SRS resource group includes a single SRS resource of the SRS resource group. In some examples, the SRS configuration manager 1015 may receive the SRS configuration indicating a codebook SRS configuration. In some cases, each bit sequence of the set of bit sequences includes a single bit.

The capability message manager 1010 may transmit a capability message indicating a first number of one or more transmit antennas supported by the UE for antenna switching and a second number of ports supported for uplink transmission that exceeds the first number of transmit antennas. The SRS configuration manager 1015 may receive, based on the capability message, a SRS configuration indicating a mapping between each SRS resource of a set of SRS resources and a respective bit sequence of a set of bit sequences. The bit sequence reception manager 1020 may receive a control message including a first bit sequence of the set of bit sequences indicating a first SRS resource of the set of SRS resources and a second bit sequence of the set of bit sequences indicating a second SRS resource of the set of SRS resources based on the mapping. The first SRS transmission manager 1025 may transmit a first SRS in the first SRS resource based on the first bit sequence indicated in the control message. The second SRS transmission manager 1030 may transmit a second SRS in the second SRS resource based on the second bit sequence indicated in the control message.

In some examples, the SRS configuration manager 1015 may receive the SRS configuration indicating a codebook SRS configuration. In some examples, the mapping table reception manager 1035 may receive the SRS configuration indicating a mapping table corresponding to the mapping, where the respective bit sequences indicates respective indexes to the mapping table.

In some examples, the capability message manager 1010 may transmit the capability message indicating a third number of one or more receive antennas supported for antenna switching, the SRS configuration based on the third number of receive antennas supported for antenna switching. In some cases, the third number of one or more receive antennas exceeds the first number of one or more transmit antennas.

In some examples, the bit sequence reception manager 1020 may receive a downlink control information message including the first bit sequence and the second bit sequence.

Figure 11:
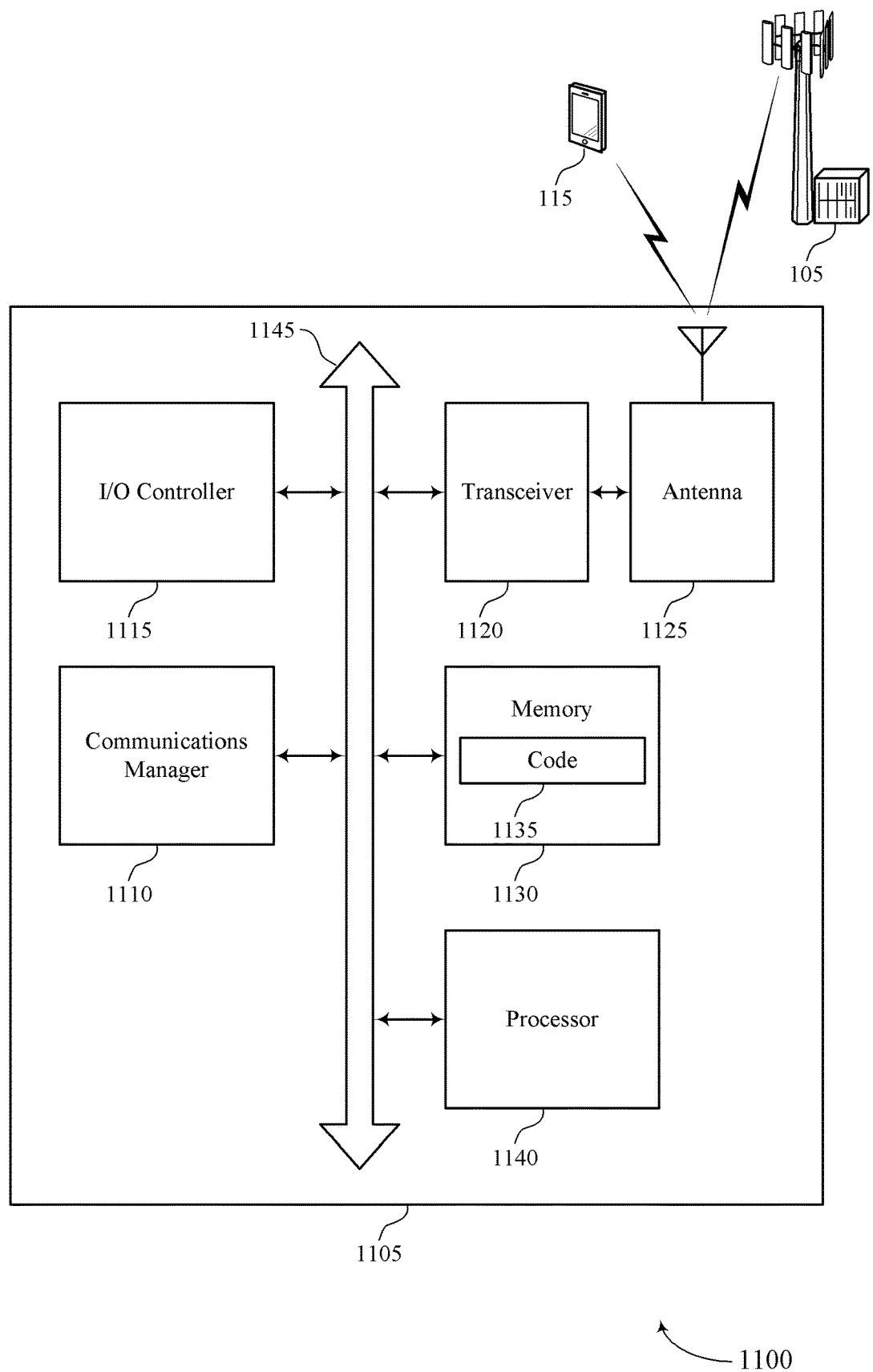
FIG. 11 shows a diagram of a system including a device that supports techniques for indicating SRS resources in accordance with aspects of the present disclosure.

FIG. 11 shows a diagram of a system 1100 including a device 1105 that supports techniques for indicating SRS resources in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may transmit a capability message indicating a first number of one or more transmit antennas supported by the UE for antenna switching and a second number of ports supported for uplink transmission that exceeds the first number of one or more transmit antennas, receive, based on the capability message, a SRS configuration indicating a mapping between each SRS resource group for at least a subset of a set of SRS resource groups and a respective bit sequence of a set of bit sequences, receive a control message including a first bit sequence of the set of bit sequences indicating a first SRS resource group of the subset of the set of SRS resource groups based on the mapping, transmit a first SRS in a first SRS resource of the first SRS resource group based on the control message, and transmit a second SRS in a second SRS resource of the first SRS resource group based on the control message. The communications manager 1110 may also transmit a capability message indicating a first number of one or more transmit antennas supported by the UE for antenna switching and a second number of ports supported for uplink transmission that exceeds the first number of transmit antennas, receive, based on the capability message, a SRS configuration indicating a mapping between each SRS resource of a set of SRS resources and a respective bit sequence of a set of bit sequences, receive a control message including a first bit sequence of the set of bit sequences indicating a first SRS resource of the set of SRS resources and a second bit sequence of the set of bit sequences indicating a second SRS resource of the set of SRS resources based on the mapping, transmit a first SRS in the first SRS resource based on the first bit sequence indicated in the control message, and transmit a second SRS in the second SRS resource based on the second bit sequence indicated in the control message.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for indicating SRS resources).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
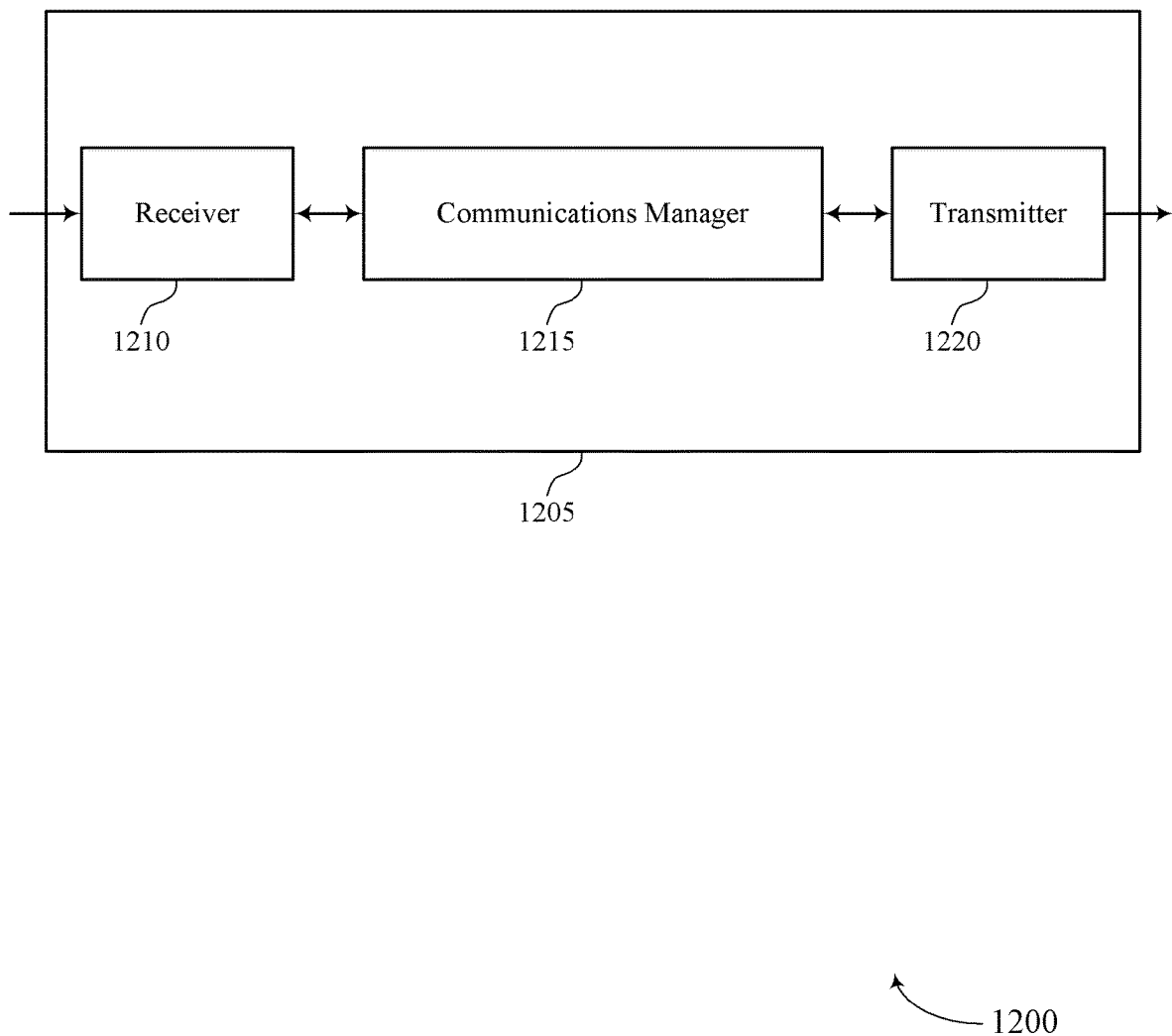
FIGS. 12 and 13 show block diagrams of devices that support techniques for indicating SRS resources in accordance with aspects of the present disclosure.

FIG. 12 shows a block diagram 1200 of a device 1205 that supports techniques for indicating SRS resources in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for indicating SRS resources, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive, from a UE, a capability message indicating a first number of one or more transmit antennas supported by the UE for antenna switching and a second number of ports supported for uplink transmission that exceeds the first number of one or more transmit antennas, transmit, based on the capability message, a SRS configuration indicating a mapping between each SRS resource group for at least a subset of a set of SRS resource groups and a respective bit sequence of a set of bit sequences, transmit a control message including a first bit sequence of the set of bit sequences indicating a first SRS resource group of the subset of the set of SRS resource groups based on the mapping, receive a first SRS in a first SRS resource of the first SRS resource group based on the control message, and receive a second SRS in a second SRS resource of the first SRS resource group based on the control message. The communications manager 1215 may also receive, from a UE, a capability message indicating a first number of one or more transmit antennas supported by the UE for antenna switching and a second number of ports supported for uplink transmission that exceeds the first number of transmit antennas, transmit, based on the capability message, a SRS configuration indicating a mapping between each SRS resource of a set of SRS resources and a respective bit sequence of a set of bit sequences, transmit a control message including a first bit sequence of the set of bit sequences indicating a first SRS resource of the set of SRS resources and a second bit sequence of the set of bit sequences indicating a second SRS resource of the set of SRS resources based on the mapping, receive a first SRS in the first SRS resource based on the first bit sequence indicated in the control message, and receive a second SRS in the second SRS resource based on the second bit sequence indicated in the control message. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
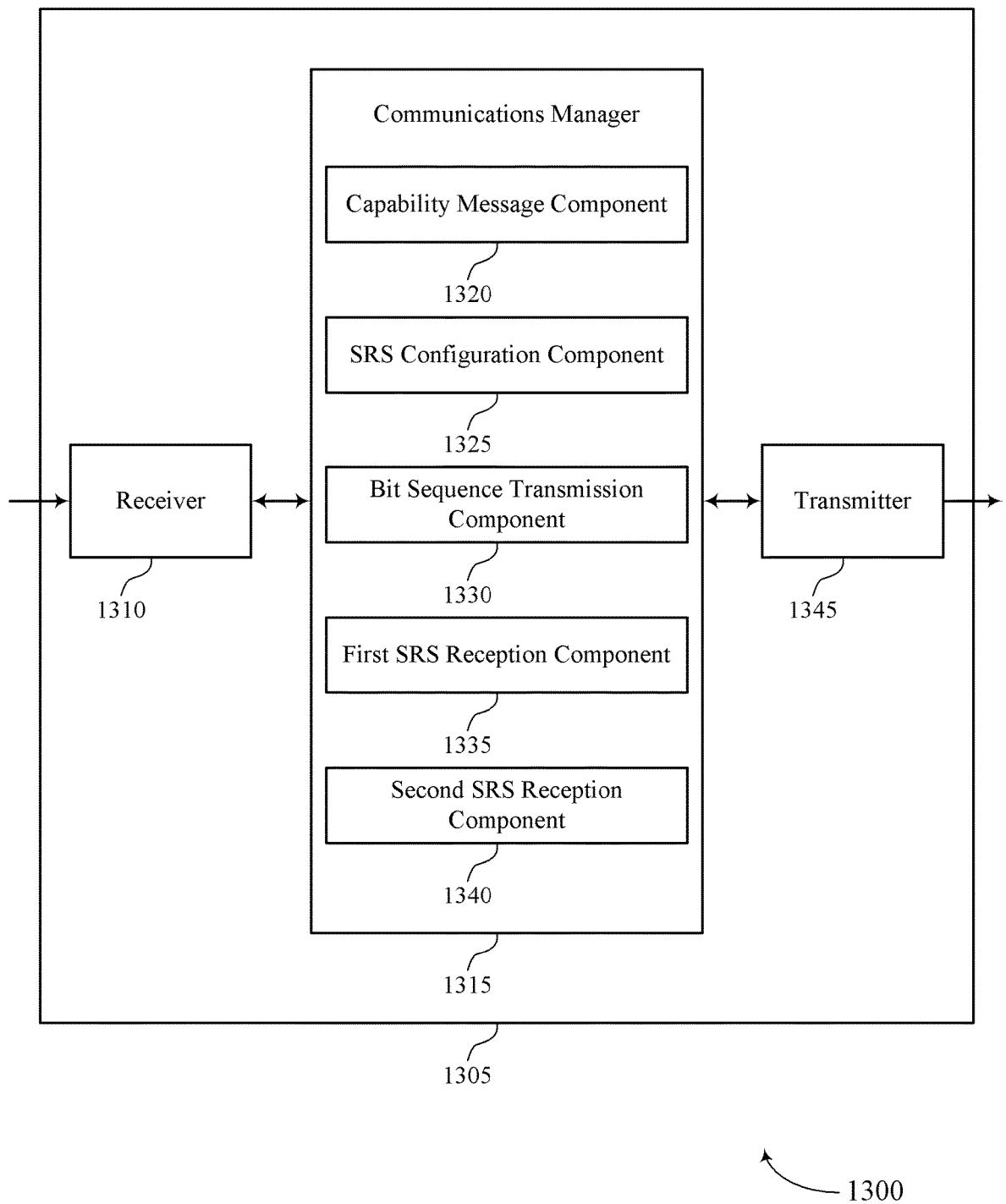

FIG. 13 shows a block diagram 1300 of a device 1305 that supports techniques for indicating SRS resources in accordance with aspects of the present disclosure. The device 1305 may be an example of aspects of a device 1205, or a base station 105 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for indicating SRS resources, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a capability message component 1320, a SRS configuration component 1325, a bit sequence transmission component 1330, a first SRS reception component 1335, and a second SRS reception component 1340. The communications manager 1315 may be an example of aspects of the communications manager 1510 described herein.

The capability message component 1320 may receive, from a UE, a capability message indicating a first number of one or more transmit antennas supported by the UE for antenna switching and a second number of ports supported for uplink transmission that exceeds the first number of one or more transmit antennas. The SRS configuration component 1325 may transmit, based on the capability message, a SRS configuration indicating a mapping between each SRS resource group for at least a subset of a set of SRS resource groups and a respective bit sequence of a set of bit sequences. The bit sequence transmission component 1330 may transmit a control message including a first bit sequence of the set of bit sequences indicating a first SRS resource group of the subset of the set of SRS resource groups based on the mapping. The first SRS reception component 1335 may receive a first SRS in a first SRS resource of the first SRS resource group based on the control message. The second SRS reception component 1340 may receive a second SRS in a second SRS resource of the first SRS resource group based on the control message.

The capability message component 1320 may receive, from a UE, a capability message indicating a first number of one or more transmit antennas supported by the UE for antenna switching and a second number of ports supported for uplink transmission that exceeds the first number of transmit antennas. The SRS configuration component 1325 may transmit, based on the capability message, a SRS configuration indicating a mapping between each SRS resource of a set of SRS resources and a respective bit sequence of a set of bit sequences. The bit sequence transmission component 1330 may transmit a control message including a first bit sequence of the set of bit sequences indicating a first SRS resource of the set of SRS resources and a second bit sequence of the set of bit sequences indicating a second SRS resource of the set of SRS resources based on the mapping. The first SRS reception component 1335 may receive a first SRS in the first SRS resource based on the first bit sequence indicated in the control message. The second SRS reception component 1340 may receive a second SRS in the second SRS resource based on the second bit sequence indicated in the control message.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
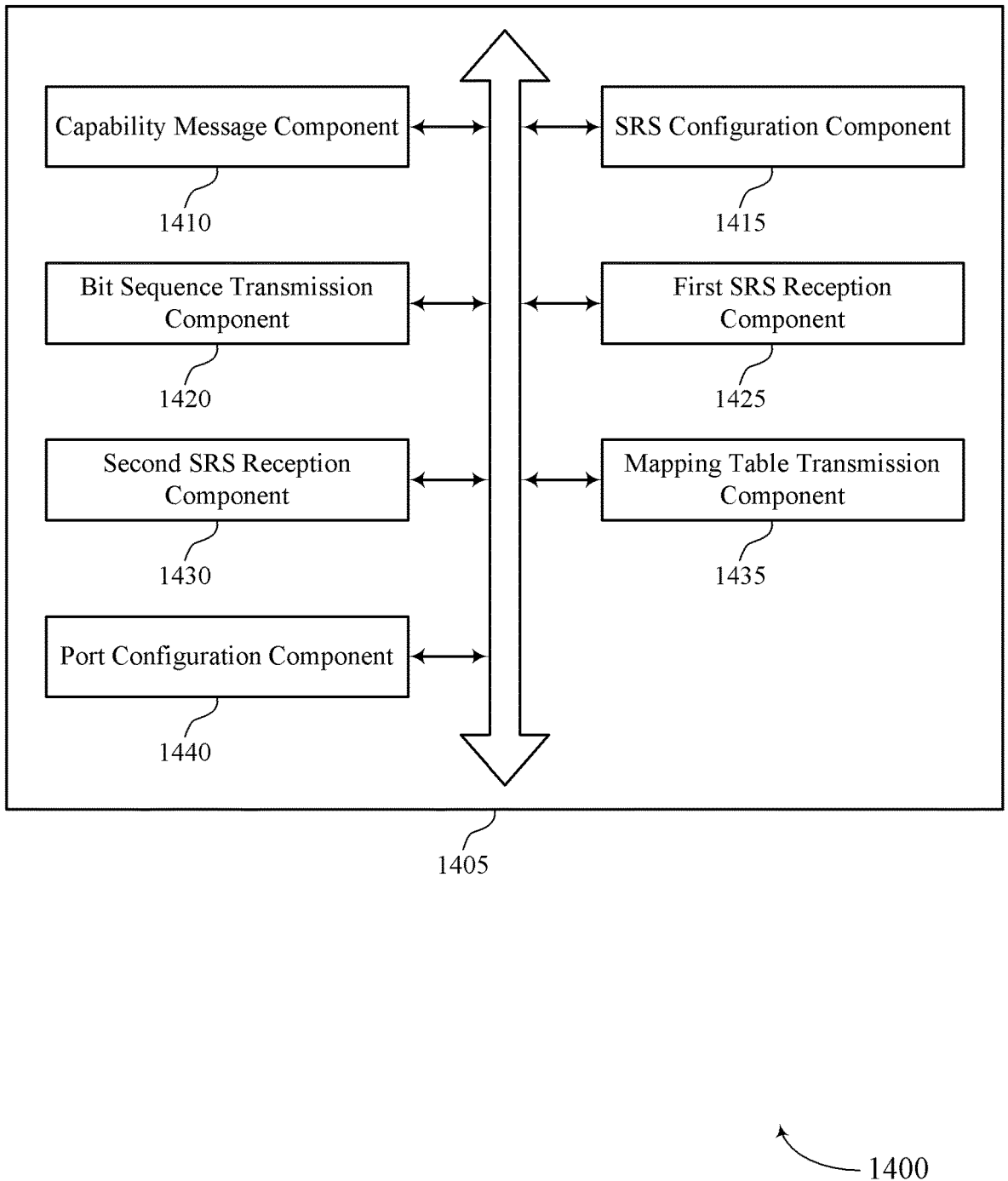
FIG. 14 shows a block diagram of a communications manager that supports techniques for indicating SRS resources in accordance with aspects of the present disclosure.

FIG. 14 shows a block diagram 1400 of a communications manager 1405 that supports techniques for indicating SRS resources in accordance with aspects of the present disclosure. The communications manager 1405 may be an example of aspects of a communications manager 1215, a communications manager 1315, or a communications manager 1510 described herein. The communications manager 1405 may include a capability message component 1410, a SRS configuration component 1415, a bit sequence transmission component 1420, a first SRS reception component 1425, a second SRS reception component 1430, a mapping table transmission component 1435, and a port configuration component 1440. Each of these modules may communicate, directly or indirectly, with one another (e.g., via one or more buses).

The capability message component 1410 may receive, from a UE, a capability message indicating a first number of one or more transmit antennas supported by the UE for antenna switching and a second number of ports supported for uplink transmission that exceeds the first number of one or more transmit antennas. The SRS configuration component 1415 may transmit, based on the capability message, a SRS configuration indicating a mapping between each SRS resource group for at least a subset of a set of SRS resource groups and a respective bit sequence of a set of bit sequences. The bit sequence transmission component 1420 may transmit a control message including a first bit sequence of the set of bit sequences indicating a first SRS resource group of the subset of the set of SRS resource groups based on the mapping. The first SRS reception component 1425 may receive a first SRS in a first SRS resource of the first SRS resource group based on the control message. The second SRS reception component 1430 may receive a second SRS in a second SRS resource of the first SRS resource group based on the control message.

The mapping table transmission component 1435 may transmit the SRS configuration indicating a mapping table that indicates the mapping between each SRS resource group for at least the subset of the set of SRS resource groups and the respective bit sequence of the set of bit sequences. The port configuration component 1440 may transmit the SRS configuration indicating a number of configured ports for antenna switching and a number of configured ports for uplink transmission, where the mapping is based on the number of configured ports for antenna switching and the number of configured ports for uplink transmission.

In some examples, the SRS configuration component 1415 may transmit the SRS configuration indicating a mapping between each SRS group of the set of SRS resource groups and a respective bit sequence of the set of bit sequences.

In some examples, the capability message component 1410 may receive the capability message indicating a third number of one or more receive antennas supported for antenna switching, the SRS configuration based on the third number of receive antennas supported for antenna switching. In some cases, the third number of one or more receive antennas exceeds the first number of one or more transmit antennas.

In some examples, the bit sequence transmission component 1420 may transmit a downlink control information message including the first bit sequence.

In some cases, each SRS resource group includes a single SRS resource of the SRS resource group. In some examples, the SRS configuration component 1415 may transmit the SRS configuration indicating a codebook SRS configuration. In some cases, each bit sequence of the set of bit sequences includes a single bit.

The capability message component 1410 may receive, from a UE, a capability message indicating a first number of one or more transmit antennas supported by the UE for antenna switching and a second number of ports supported for uplink transmission that exceeds the first number of transmit antennas. The SRS configuration component 1415 may transmit, based on the capability message, a SRS configuration indicating a mapping between each SRS resource of a set of SRS resources and a respective bit sequence of a set of bit sequences. The bit sequence transmission component 1420 may transmit a control message including a first bit sequence of the set of bit sequences indicating a first SRS resource of the set of SRS resources and a second bit sequence of the set of bit sequences indicating a second SRS resource of the set of SRS resources based on the mapping. The first SRS reception component 1425 may receive a first SRS in the first SRS resource based on the first bit sequence indicated in the control message. The second SRS reception component 1430 may receive a second SRS in the second SRS resource based on the second bit sequence indicated in the control message.

In some examples, the SRS configuration component 1415 may transmit the SRS configuration indicating a codebook SRS configuration.

In some examples, the mapping table transmission component 1435 may transmit the SRS configuration indicating a mapping table corresponding to the mapping, where the respective bit sequences indicates respective indexes to the mapping table.

In some examples, the capability message component 1410 may receive the capability message indicating a third number of one or more receive antennas supported for antenna switching, the SRS configuration based on the third number of receive antennas supported for antenna switching. In some cases, the third number of one or more receive antennas exceeds the first number of one or more transmit antennas.

In some examples, the bit sequence transmission component 1420 may transmit a downlink control information message including the first bit sequence and the second bit sequence.

Figure 15:
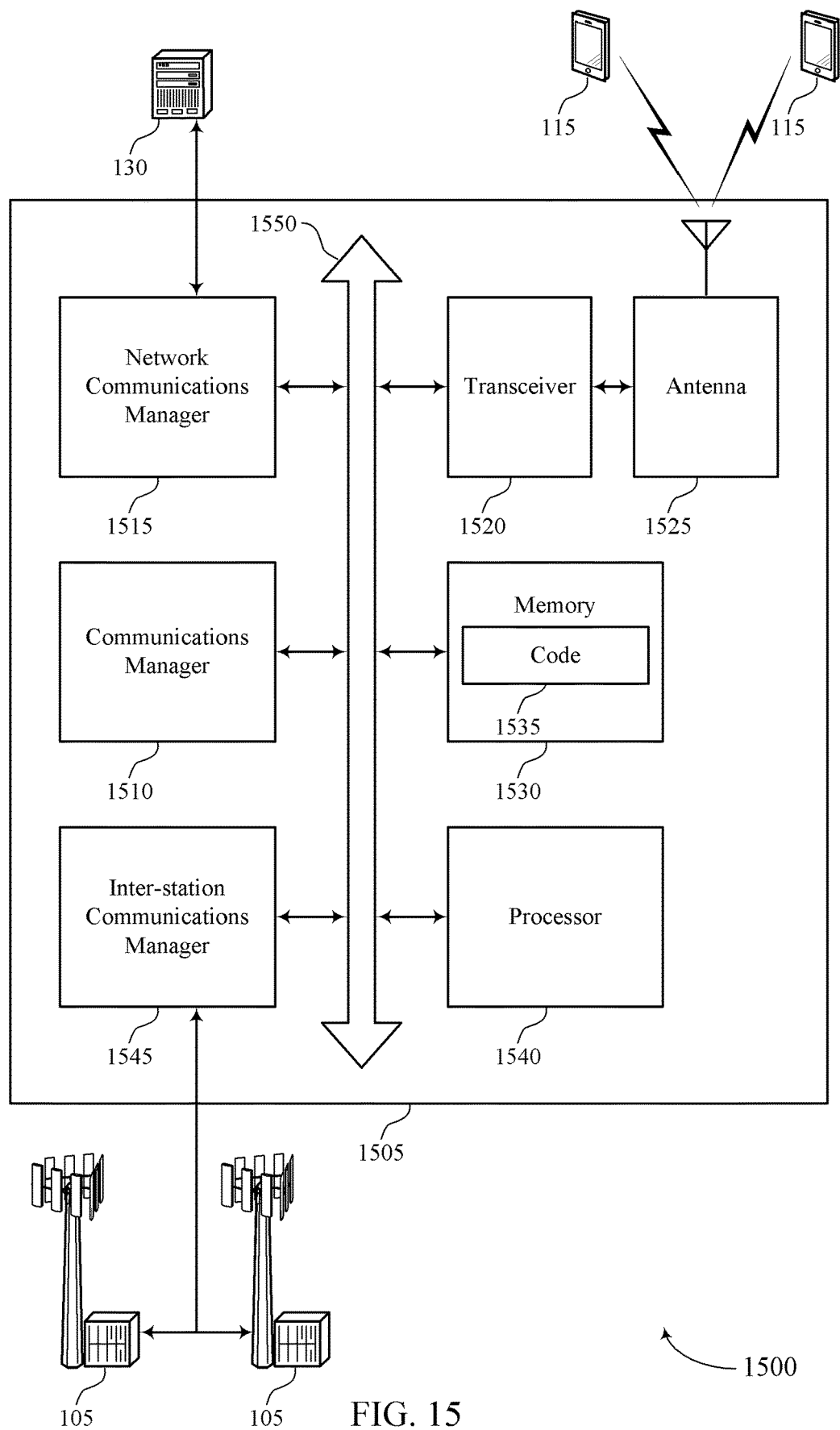
FIG. 15 shows a diagram of a system including a device that supports techniques for indicating SRS resources in accordance with aspects of the present disclosure.

FIG. 15 shows a diagram of a system 1500 including a device 1505 that supports techniques for indicating SRS resources in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive, from a UE, a capability message indicating a first number of one or more transmit antennas supported by the UE for antenna switching and a second number of ports supported for uplink transmission that exceeds the first number of one or more transmit antennas, transmit, based on the capability message, a SRS configuration indicating a mapping between each SRS resource group for at least a subset of a set of SRS resource groups and a respective bit sequence of a set of bit sequences, transmit a control message including a first bit sequence of the set of bit sequences indicating a first SRS resource group of the subset of the set of SRS resource groups based on the mapping, receive a first SRS in a first SRS resource of the first SRS resource group based on the control message, and receive a second SRS in a second SRS resource of the first SRS resource group based on the control message. The communications manager 1510 may also receive, from a UE, a capability message indicating a first number of one or more transmit antennas supported by the UE for antenna switching and a second number of ports supported for uplink transmission that exceeds the first number of transmit antennas, transmit, based on the capability message, a SRS configuration indicating a mapping between each SRS resource of a set of SRS resources and a respective bit sequence of a set of bit sequences, transmit a control message including a first bit sequence of the set of bit sequences indicating a first SRS resource of the set of SRS resources and a second bit sequence of the set of bit sequences indicating a second SRS resource of the set of SRS resources based on the mapping, receive a first SRS in the first SRS resource based on the first bit sequence indicated in the control message, and receive a second SRS in the second SRS resource based on the second bit sequence indicated in the control message.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting techniques for indicating SRS resources).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
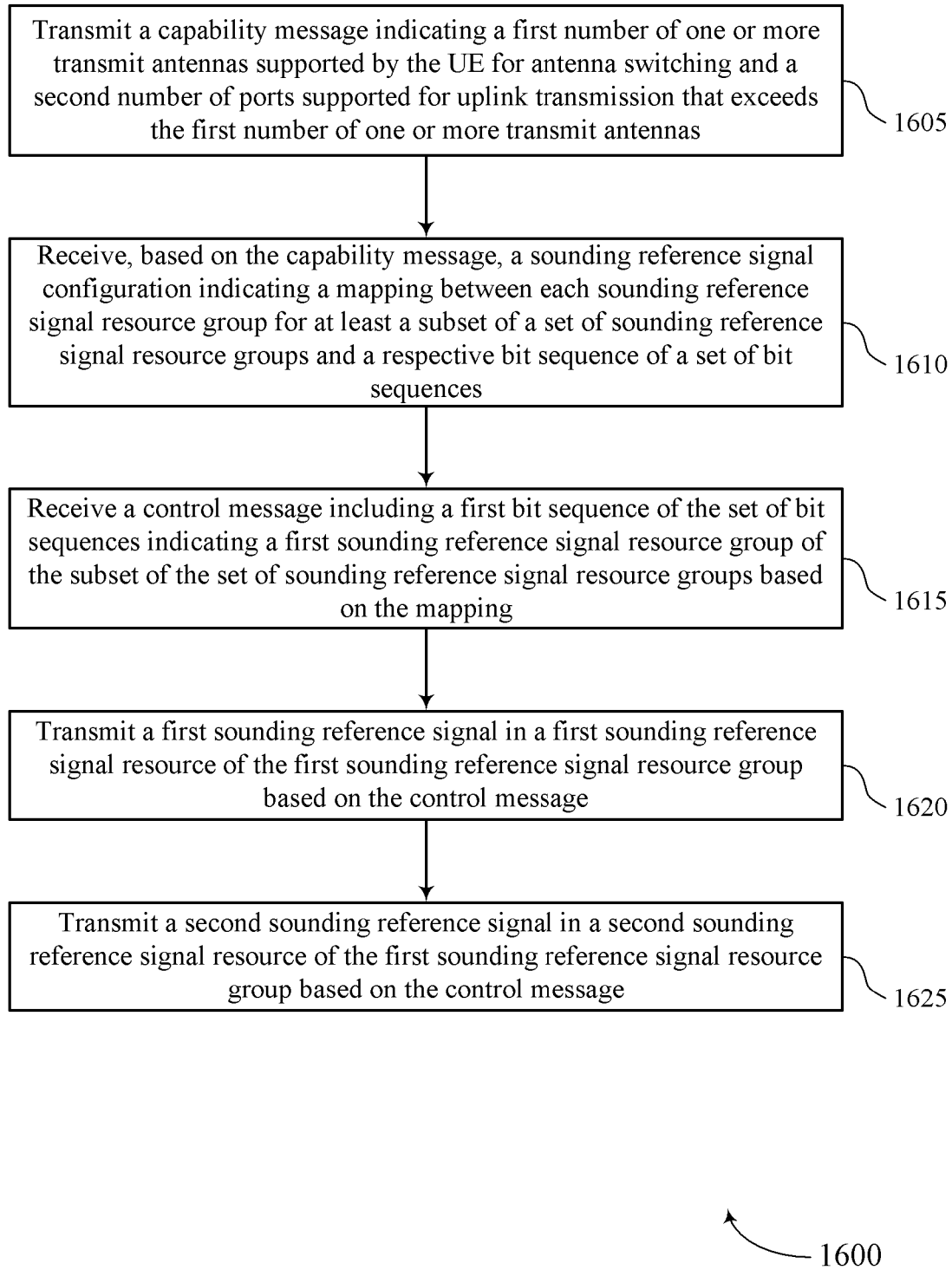
FIGS. 16 through 19 show flowcharts illustrating methods that support techniques for indicating SRS resources in accordance with aspects of the present disclosure.

FIG. 16 shows a flowchart illustrating a method 1600 that supports techniques for indicating SRS resources in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may transmit a capability message indicating a first number of one or more transmit antennas supported by the UE for antenna switching and a second number of ports supported for uplink transmission that exceeds the first number of one or more transmit antennas. The operations of 1605 may be performed according to the methods described herein. In some examples, aspects of the operations of 1605 may be performed by a capability message manager as described with reference to FIGS. 8 through 11.

At 1610, the UE may receive, based on the capability message, a SRS configuration indicating a mapping between each SRS resource group for at least a subset of a set of SRS resource groups and a respective bit sequence of a set of bit sequences. The operations of 1610 may be performed according to the methods described herein. In some examples, aspects of the operations of 1610 may be performed by a SRS configuration manager as described with reference to FIGS. 8 through 11.

At 1615, the UE may receive a control message including a first bit sequence of the set of bit sequences indicating a first SRS resource group of the subset of the set of SRS resource groups based on the mapping. The operations of 1615 may be performed according to the methods described herein. In some examples, aspects of the operations of 1615 may be performed by a bit sequence reception manager as described with reference to FIGS. 8 through 11.

At 1620, the UE may transmit a first SRS in a first SRS resource of the first SRS resource group based on the control message. The operations of 1620 may be performed according to the methods described herein. In some examples, aspects of the operations of 1620 may be performed by a first SRS transmission manager as described with reference to FIGS. 8 through 11.

At 1625, the UE may transmit a second SRS in a second SRS resource of the first SRS resource group based on the control message. The operations of 1625 may be performed according to the methods described herein. In some examples, aspects of the operations of 1625 may be performed by a second SRS transmission manager as described with reference to FIGS. 8 through 11.

Figure 17:
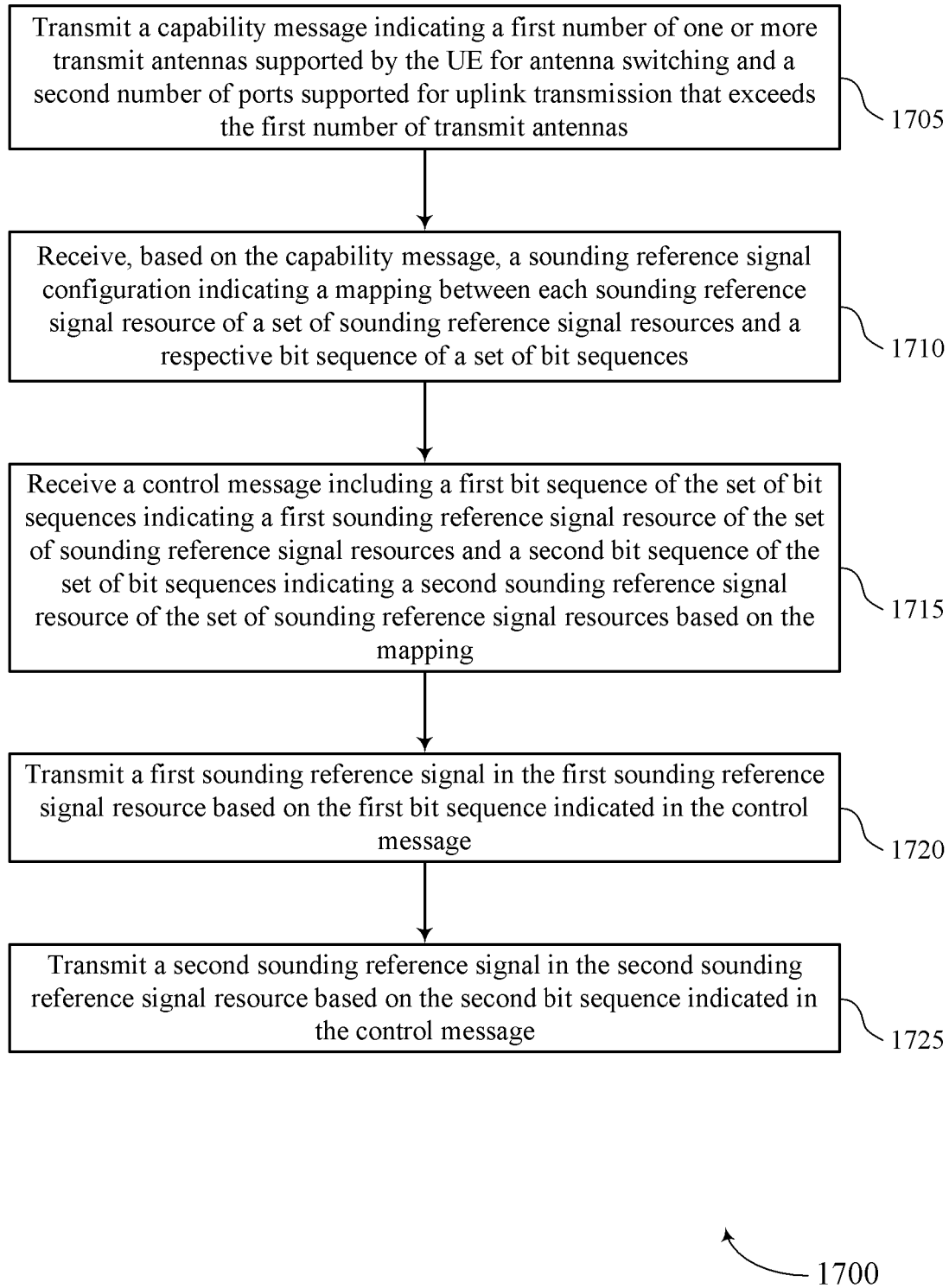

FIG. 17 shows a flowchart illustrating a method 1700 that supports techniques for indicating SRS resources in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may transmit a capability message indicating a first number of one or more transmit antennas supported by the UE for antenna switching and a second number of ports supported for uplink transmission that exceeds the first number of transmit antennas. The operations of 1705 may be performed according to the methods described herein. In some examples, aspects of the operations of 1705 may be performed by a capability message manager as described with reference to FIGS. 8 through 11.

At 1710, the UE may receive, based on the capability message, a SRS configuration indicating a mapping between each SRS resource of a set of SRS resources and a respective bit sequence of a set of bit sequences. The operations of 1710 may be performed according to the methods described herein. In some examples, aspects of the operations of 1710 may be performed by a SRS configuration manager as described with reference to FIGS. 8 through 11.

At 1715, the UE may receive a control message including a first bit sequence of the set of bit sequences indicating a first SRS resource of the set of SRS resources and a second bit sequence of the set of bit sequences indicating a second SRS resource of the set of SRS resources based on the mapping. The operations of 1715 may be performed according to the methods described herein. In some examples, aspects of the operations of 1715 may be performed by a bit sequence reception manager as described with reference to FIGS. 8 through 11.

At 1720, the UE may transmit a first SRS in the first SRS resource based on the first bit sequence indicated in the control message. The operations of 1720 may be performed according to the methods described herein. In some examples, aspects of the operations of 1720 may be performed by a first SRS transmission manager as described with reference to FIGS. 8 through 11.

At 1725, the UE may transmit a second SRS in the second SRS resource based on the second bit sequence indicated in the control message. The operations of 1725 may be performed according to the methods described herein. In some examples, aspects of the operations of 1725 may be performed by a second SRS transmission manager as described with reference to FIGS. 8 through 11.

Figure 18:
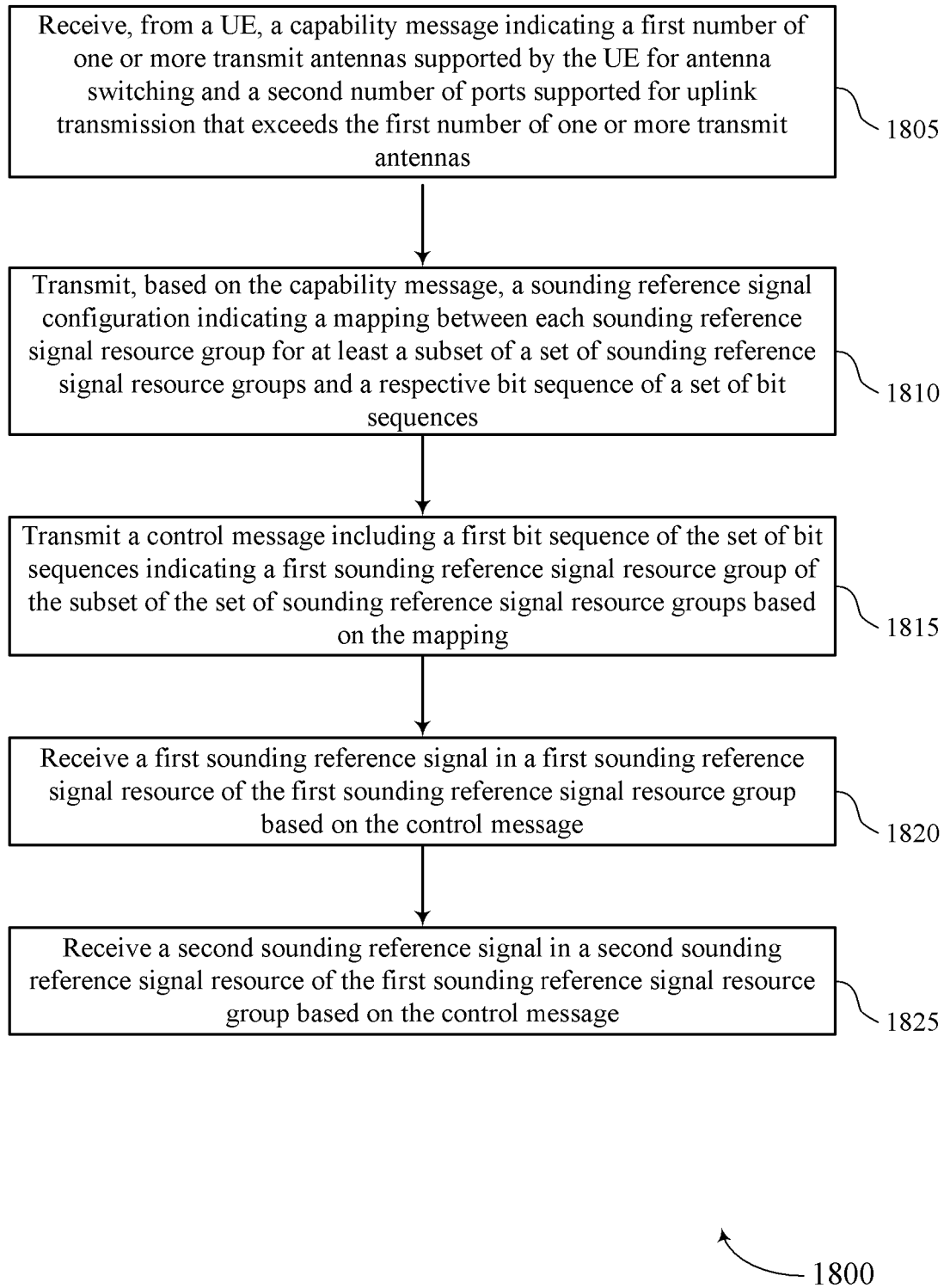

FIG. 18 shows a flowchart illustrating a method 1800 that supports techniques for indicating SRS resources in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, a capability message indicating a first number of one or more transmit antennas supported by the UE for antenna switching and a second number of ports supported for uplink transmission that exceeds the first number of one or more transmit antennas. The operations of 1805 may be performed according to the methods described herein. In some examples, aspects of the operations of 1805 may be performed by a capability message component as described with reference to FIGS. 12 through 15.

At 1810, the base station may transmit, based on the capability message, a SRS configuration indicating a mapping between each SRS resource group for at least a subset of a set of SRS resource groups and a respective bit sequence of a set of bit sequences. The operations of 1810 may be performed according to the methods described herein. In some examples, aspects of the operations of 1810 may be performed by a SRS configuration component as described with reference to FIGS. 12 through 15.

At 1815, the base station may transmit a control message including a first bit sequence of the set of bit sequences indicating a first SRS resource group of the subset of the set of SRS resource groups based on the mapping. The operations of 1815 may be performed according to the methods described herein. In some examples, aspects of the operations of 1815 may be performed by a bit sequence transmission component as described with reference to FIGS. 12 through 15.

At 1820, the base station may receive a first SRS in a first SRS resource of the first SRS resource group based on the control message. The operations of 1820 may be performed according to the methods described herein. In some examples, aspects of the operations of 1820 may be performed by a first SRS reception component as described with reference to FIGS. 12 through 15.

At 1825, the base station may receive a second SRS in a second SRS resource of the first SRS resource group based on the control message. The operations of 1825 may be performed according to the methods described herein. In some examples, aspects of the operations of 1825 may be performed by a second SRS reception component as described with reference to FIGS. 12 through 15.

Figure 19:
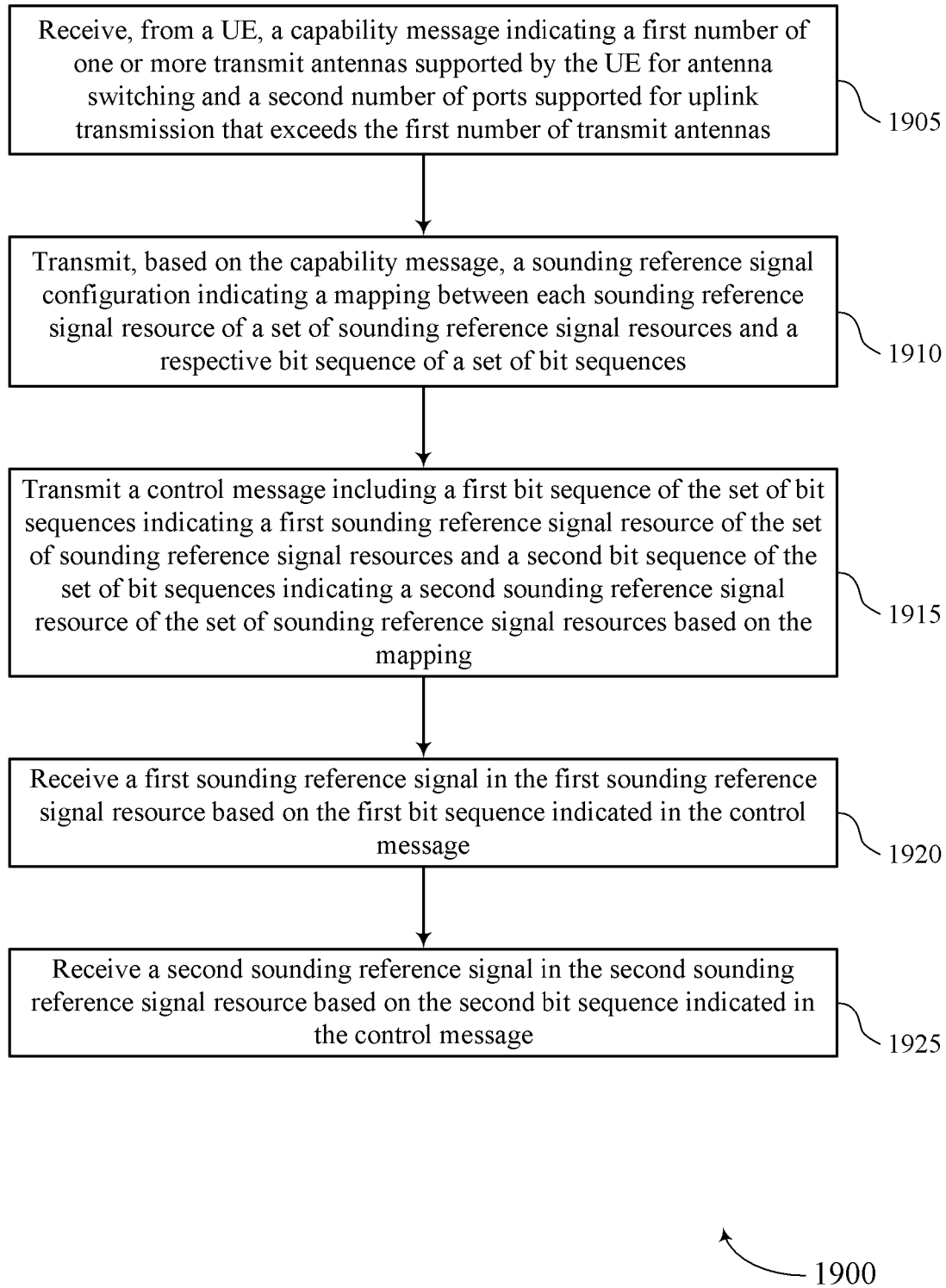

FIG. 19 shows a flowchart illustrating a method 1900 that supports techniques for indicating SRS resources in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE, a capability message indicating a first number of one or more transmit antennas supported by the UE for antenna switching and a second number of ports supported for uplink transmission that exceeds the first number of transmit antennas. The operations of 1905 may be performed according to the methods described herein. In some examples, aspects of the operations of 1905 may be performed by a capability message component as described with reference to FIGS. 12 through 15.

At 1910, the base station may transmit, based on the capability message, a SRS configuration indicating a mapping between each SRS resource of a set of SRS resources and a respective bit sequence of a set of bit sequences. The operations of 1910 may be performed according to the methods described herein. In some examples, aspects of the operations of 1910 may be performed by a SRS configuration component as described with reference to FIGS. 12 through 15.

At 1915, the base station may transmit a control message including a first bit sequence of the set of bit sequences indicating a first SRS resource of the set of SRS resources and a second bit sequence of the set of bit sequences indicating a second SRS resource of the set of SRS resources based on the mapping. The operations of 1915 may be performed according to the methods described herein. In some examples, aspects of the operations of 1915 may be performed by a bit sequence transmission component as described with reference to FIGS. 12 through 15.

At 1920, the base station may receive a first SRS in the first SRS resource based on the first bit sequence indicated in the control message. The operations of 1920 may be performed according to the methods described herein. In some examples, aspects of the operations of 1920 may be performed by a first SRS reception component as described with reference to FIGS. 12 through 15.

At 1925, the base station may receive a second SRS in the second SRS resource based on the second bit sequence indicated in the control message. The operations of 1925 may be performed according to the methods described herein. In some examples, aspects of the operations of 1925 may be performed by a second SRS reception component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Aspect 1: A method for wireless communications at a UE, comprising: transmitting a capability message indicating a first number of one or more transmit antennas supported by the UE for antenna switching and a second number of ports supported for uplink transmission that exceeds the first number of one or more transmit antennas; receiving, based at least in part on the capability message, a SRS configuration indicating a mapping between each SRS resource group for at least a subset of a plurality of SRS resource groups and a respective bit sequence of a plurality of bit sequences; receiving a control message comprising a first bit sequence of the plurality of bit sequences indicating a first SRS resource group of the subset of the plurality of SRS resource groups based at least in part on the mapping; transmitting a first SRS in a first SRS resource of the first SRS resource group based at least in part on the control message; and transmitting a second SRS in a second SRS resource of the first SRS resource group based at least in part on the control message.

Aspect 2: The method of aspect 1, wherein receiving the SRS configuration further comprises: receiving the SRS configuration indicating a mapping table that indicates the mapping between each SRS resource group for at least the subset of the plurality of SRS resource groups and the respective bit sequence of the plurality of bit sequences.

Aspect 3: The method of any of aspects 1 or 2, wherein receiving the SRS configuration further comprises: receiving the SRS configuration indicating a number of configured ports for antenna switching and a number of configured ports for uplink transmission, wherein the mapping is based at least in part on the number of configured ports for antenna switching and the number of configured ports for uplink transmission.

Aspect 4: The method of any of aspects 1 to 3, wherein receiving the SRS configuration indicating the mapping further comprises: receiving the SRS configuration indicating a mapping between each SRS group of the plurality of SRS resource groups and a respective bit sequence of the plurality of bit sequences.

Aspect 5: The method of any of aspects 1 to 4, wherein transmitting the capability message further comprises: transmitting the capability message indicating a third number of one or more receive antennas supported for antenna switching, the SRS configuration based at least in part on the third number of receive antennas supported for antenna switching.

Aspect 6: The method of aspect 5, wherein the third number of one or more receive antennas exceeds the first number of one or more transmit antennas.

Aspect 7: The method of any of aspects 1 to 6, wherein receiving the control message further comprises: receiving a downlink control information message comprising the first bit sequence.

Aspect 8: The method of any of aspects 1 to 7, wherein each SRS resource group comprises a single SRS resource of the SRS resource group.

Aspect 9: The method of any of aspects 1 to 8, wherein receiving the SRS configuration further comprises: receiving the SRS configuration indicating a codebook SRS configuration.

Aspect 10: The method of any of aspects 1 to 9, wherein each bit sequence of the plurality of bit sequences comprises a single bit.

Aspect 11: A method for wireless communications at a UE, comprising: transmitting a capability message indicating a first number of one or more transmit antennas supported by the UE for antenna switching and a second number of ports supported for uplink transmission that exceeds the first number of transmit antennas; receiving, based at least in part on the capability message, a SRS configuration indicating a mapping between each SRS resource of a plurality of SRS resources and a respective bit sequence of a plurality of bit sequences; receiving a control message comprising a first bit sequence of the plurality of bit sequences indicating a first SRS resource of the plurality of SRS resources and a second bit sequence of the plurality of bit sequences indicating a second SRS resource of the plurality of SRS resources based at least in part on the mapping; transmitting a first SRS in the first SRS resource based at least in part on the first bit sequence indicated in the control message; and transmitting a second SRS in the second SRS resource based at least in part on the second bit sequence indicated in the control message.

Aspect 12: The method of aspect 11, wherein receiving the SRS configuration further comprises: receiving the SRS configuration indicating a codebook SRS configuration.

Aspect 13: The method of any of aspects 11 or 12, wherein receiving the SRS configuration further comprises: receiving the SRS configuration indicating a mapping table corresponding to the mapping, wherein the respective bit sequences indicates respective indexes to the mapping table.

Aspect 14: The method of any of aspects 11 to 13, wherein transmitting the capability message further comprises: transmitting the capability message indicating a third number of one or more receive antennas supported for antenna switching, the SRS configuration based at least in part on the third number of receive antennas supported for antenna switching.

Aspect 15: The method of aspect 14, wherein the third number of one or more receive antennas exceeds the first number of one or more transmit antennas.

Aspect 16: The method of any of aspects 11 to 15, wherein receiving the control message further comprises: receiving a downlink control information message comprising the first bit sequence and the second bit sequence.

Aspect 17: A method for wireless communications at a base station, comprising: receiving, from a UE, a capability message indicating a first number of one or more transmit antennas supported by the UE for antenna switching and a second number of ports supported for uplink transmission that exceeds the first number of one or more transmit antennas; transmitting, based at least in part on the capability message, a SRS configuration indicating a mapping between each SRS resource group for at least a subset of a plurality of SRS resource groups and a respective bit sequence of a plurality of bit sequences; transmitting a control message comprising a first bit sequence of the plurality of bit sequences indicating a first SRS resource group of the subset of the plurality of SRS resource groups based at least in part on the mapping; receiving a first SRS in a first SRS resource of the first SRS resource group based at least in part on the control message; and receiving a second SRS in a second SRS resource of the first SRS resource group based at least in part on the control message.

Aspect 18: The method of aspect 17, wherein transmitting the SRS configuration further comprises: transmitting the SRS configuration indicating a mapping table that indicates the mapping between each SRS resource group for at least the subset of the plurality of SRS resource groups and the respective bit sequence of the plurality of bit sequences.

Aspect 19: The method of any of aspects 17 or 18, wherein transmitting the SRS configuration further comprises: transmitting the SRS configuration indicating a number of configured ports for antenna switching and a number of configured ports for uplink transmission, wherein the mapping is based at least in part on the number of configured ports for antenna switching and the number of configured ports for uplink transmission.

Aspect 20: The method of any of aspects 17 to 19, wherein transmitting the SRS configuration indicating the mapping further comprises: transmitting the SRS configuration indicating a mapping between each SRS group of the plurality of SRS resource groups and a respective bit sequence of the plurality of bit sequences.

Aspect 21: The method of any of aspects 17 to 20, wherein receiving the capability message further comprises: receiving the capability message indicating a third number of one or more receive antennas supported for antenna switching, the SRS configuration based at least in part on the third number of receive antennas supported for antenna switching.

Aspect 22: The method of aspect 21, wherein the third number of one or more receive antennas exceeds the first number of one or more transmit antennas.

Aspect 23: The method of any of aspects 17 to 22, wherein transmitting the control message further comprises: transmitting a downlink control information message comprising the first bit sequence.

Aspect 24: The method of any of aspects 17 to 23, wherein each SRS resource group comprises a single SRS resource of the SRS resource group.

Aspect 25: The method of any of aspects 17 to 24, wherein transmitting the SRS configuration further comprises: transmitting the SRS configuration indicating a codebook SRS configuration.

Aspect 26: The method of any of aspects 17 to 25, wherein each bit sequence of the plurality of bit sequences comprises a single bit.

Aspect 27: A method for wireless communications at a base station, comprising: receiving, from a UE, a capability message indicating a first number of one or more transmit antennas supported by the UE for antenna switching and a second number of ports supported for uplink transmission that exceeds the first number of transmit antennas; transmitting, based at least in part on the capability message, a SRS configuration indicating a mapping between each SRS resource of a plurality of SRS resources and a respective bit sequence of a plurality of bit sequences; transmitting a control message comprising a first bit sequence of the plurality of bit sequences indicating a first SRS resource of the plurality of SRS resources and a second bit sequence of the plurality of bit sequences indicating a second SRS resource of the plurality of SRS resources based at least in part on the mapping; receiving a first SRS in the first SRS resource based at least in part on the first bit sequence indicated in the control message; and receiving a second SRS in the second SRS resource based at least in part on the second bit sequence indicated in the control message.

Aspect 28: The method of aspect 27, wherein transmitting the SRS configuration further comprises: transmitting the SRS configuration indicating a codebook SRS configuration.

Aspect 29: The method of any of aspects 27 or 28, wherein transmitting the SRS configuration further comprises: transmitting the SRS configuration indicating a mapping table corresponding to the mapping, wherein the respective bit sequences indicates respective indexes to the mapping table.

Aspect 30: The method of any of aspects 27 to 29, wherein receiving the capability message further comprises: receiving the capability message indicating a third number of one or more receive antennas supported for antenna switching, the SRS configuration based at least in part on the third number of receive antennas supported for antenna switching.

Aspect 31: The method of aspect 30, wherein the third number of one or more receive antennas exceeds the first number of one or more transmit antennas.

Aspect 32: The method of any of aspects 27 to 31, wherein transmitting the control message further comprises: transmitting a downlink control information message comprising the first bit sequence and the second bit sequence.

Aspect 33: An apparatus comprising at least one means for performing a method of any of aspects 1 to 10.

Aspect 34: An apparatus for wireless communications comprising a processor; memory in electronic communication with the processor; and instructions stored in the memory and executable by the processor to cause the apparatus to perform a method of any of aspects 1 to 10.

Aspect 35: A non-transitory computer-readable medium storing code for wireless communications, the code comprising instructions executable by a processor to perform a method of any of aspects 1 to 10.

Aspect 36: An apparatus comprising at least one means for performing a method of any of aspects 11 to 16.

Aspect 37: An apparatus for wireless communications comprising a processor; memory in electronic communication with the processor; and instructions stored in the memory and executable by the processor to cause the apparatus to perform a method of any of aspects 11 to 16.

Aspect 38: A non-transitory computer-readable medium storing code for wireless communications, the code comprising instructions executable by a processor to perform a method of any of aspects 11 to 16.

Aspect 39: An apparatus comprising at least one means for performing a method of any of aspects 17 to 26.

Aspect 40: An apparatus for wireless communications comprising a processor; memory in electronic communication with the processor; and instructions stored in the memory and executable by the processor to cause the apparatus to perform a method of any of aspects 17 to 26.

Aspect 41: A non-transitory computer-readable medium storing code for wireless communications, the code comprising instructions executable by a processor to perform a method of any of aspects 17 to 26.

Aspect 42: An apparatus comprising at least one means for performing a method of any of aspects 27 to 32.

Aspect 43: An apparatus for wireless communications comprising a processor; memory in electronic communication with the processor; and instructions stored in the memory and executable by the processor to cause the apparatus to perform a method of any of aspects 27 to 32.

Aspect 44: A non-transitory computer-readable medium storing code for wireless communications, the code comprising instructions executable by a processor to perform a method of any of aspects 27 to 32.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   a processor,
   memory coupled with the processor; and
   instructions stored in the memory and executable by the processor to cause the apparatus to:
   transmit a capability message indicating a first number of one or more transmit antennas supported by the UE for antenna switching and a second number of ports supported for uplink transmission that exceeds the first number of one or more transmit antennas;
   receive, based at least in part on the capability message, a sounding reference signal configuration indicating a mapping between each sounding reference signal resource group for at least a subset of a plurality of sounding reference signal resource groups and a respective bit sequence of a plurality of bit sequences;

receive a control message comprising a first bit sequence of the plurality of bit sequences indicating a first sounding reference signal resource group of the subset of the plurality of sounding reference signal resource groups based at least in part on the mapping;

transmit a first sounding reference signal in a first sounding reference signal resource of the first sounding reference signal resource group based at least in part on the control message; and transmit a second sounding reference signal in a second sounding reference signal resource of the first sounding reference signal resource group based at least in part on the control message.

2. The apparatus of claim 1, wherein the instructions to receive the sounding reference signal configuration further are executable by the processor to cause the apparatus to:
receive the sounding reference signal configuration indicating a mapping table that indicates the mapping between each sounding reference signal resource group for at least the subset of the plurality of sounding reference signal resource groups and the respective bit sequence of the plurality of bit sequences.

3. The apparatus of claim 1, wherein the instructions to receive the sounding reference signal configuration further are executable by the processor to cause the apparatus to:
receive the sounding reference signal configuration indicating a number of configured ports for antenna switching and a number of configured ports for uplink transmission, wherein the mapping is based at least in part on the number of configured ports for antenna switching and the number of configured ports for uplink transmission.

4. The apparatus of claim 1, wherein the instructions to receive the sounding reference signal configuration indicating the mapping further are executable by the processor to cause the apparatus to:
receive the sounding reference signal configuration indicating a mapping between each sounding reference signal group of the plurality of sounding reference signal resource groups and the respective bit sequence of the plurality of bit sequences.

5. The apparatus of claim 1, wherein the instructions to transmit the capability message further are executable by the processor to cause the apparatus to:
transmit the capability message indicating a third number of one or more receive antennas supported for antenna switching, the sounding reference signal configuration based at least in part on the third number of receive antennas supported for antenna switching.

6. The apparatus of claim 5, wherein the third number of one or more receive antennas exceeds the first number of one or more transmit antennas.

7. The apparatus of claim 1, wherein the instructions to receive the control message further are executable by the processor to cause the apparatus to:
receive a downlink control information message comprising the first bit sequence.

8. The apparatus of claim 1, wherein each sounding reference signal resource group comprises a single sounding reference signal resource of the sounding reference signal resource group.

9. The apparatus of claim 1, wherein the instructions to receive the sounding reference signal configuration further are executable by the processor to cause the apparatus to:
receive the sounding reference signal configuration indicating a codebook sounding reference signal configuration.

10. The apparatus of claim 1, wherein each bit sequence of the plurality of bit sequences comprises a single bit.

11. An apparatus for wireless communications at a base station, comprising:
a processor,
memory coupled with the processor; and
instructions stored in the memory and executable by the processor to cause the apparatus to:
receive, from a user equipment (UE), a capability message indicating a first number of one or more transmit antennas supported by the UE for antenna switching and a second number of ports supported for uplink transmission that exceeds the first number of one or more transmit antennas;

transmit, based at least in part on the capability message, a sounding reference signal configuration indicating a mapping between each sounding reference signal resource group for at least a subset of a plurality of sounding reference signal resource groups and a respective bit sequence of a plurality of bit sequences;

transmit a control message comprising a first bit sequence of the plurality of bit sequences indicating a first sounding reference signal resource group of the subset of the plurality of sounding reference signal resource groups based at least in part on the mapping;

receive a first sounding reference signal in a first sounding reference signal resource of the first sounding reference signal resource group based at least in part on the control message; and receive a second sounding reference signal in a second sounding reference signal resource of the first sounding reference signal resource group based at least in part on the control message.

12. The apparatus of claim 11, wherein the instructions to transmit the sounding reference signal configuration further are executable by the processor to cause the apparatus to:
transmit the sounding reference signal configuration indicating a mapping table that indicates the mapping between each sounding reference signal resource group for at least the subset of the plurality of sounding reference signal resource groups and the respective bit sequence of the plurality of bit sequences.

13. The apparatus of claim 11, wherein the instructions to transmit the sounding reference signal configuration further are executable by the processor to cause the apparatus to:
transmit the sounding reference signal configuration indicating a number of configured ports for antenna switching and a number of configured ports for uplink transmission, wherein the mapping is based at least in part on the number of configured ports for antenna switching and the number of configured ports for uplink transmission.

14. The apparatus of claim 11, wherein the instructions to transmit the sounding reference signal configuration indicating the mapping further are executable by the processor to cause the apparatus to:
transmit the sounding reference signal configuration indicating a mapping between each sounding reference signal group of the plurality of sounding reference signal resource groups and the respective bit sequence of the plurality of bit sequences.

15. The apparatus of claim 11, wherein the instructions to receive the capability message further are executable by the processor to cause the apparatus to:
receive the capability message indicating a third number of one or more receive antennas supported for antenna switching, the sounding reference signal configuration based at least in part on the third number of receive antennas supported for antenna switching.

16. The apparatus of claim 15, wherein the third number of one or more receive antennas exceeds the first number of one or more transmit antennas.

17. The apparatus of claim 11, wherein the instructions to transmit the control message further are executable by the processor to cause the apparatus to:
transmit a downlink control information message comprising the first bit sequence.

18. The apparatus of claim 11, wherein each sounding reference signal resource group comprises a single sounding reference signal resource of the sounding reference signal resource group.

19. The apparatus of claim 11, wherein the instructions to transmit the sounding reference signal configuration further are executable by the processor to cause the apparatus to:
transmit the sounding reference signal configuration indicating a codebook sounding reference signal configuration.

20. A method for wireless communications at a user equipment (UE), comprising:
transmitting a capability message indicating a first number of one or more transmit antennas supported by the UE for antenna switching and a second number of ports supported for uplink transmission that exceeds the first number of one or more transmit antennas;
receiving, based at least in part on the capability message, a sounding reference signal configuration indicating a mapping between each sounding reference signal resource group for at least a subset of a plurality of sounding reference signal resource groups and a respective bit sequence of a plurality of bit sequences;
receiving a control message comprising a first bit sequence of the plurality of bit sequences indicating a first sounding reference signal resource group of the subset of the plurality of sounding reference signal resource groups based at least in part on the mapping;
transmitting a first sounding reference signal in a first sounding reference signal resource of the first sounding reference signal resource group based at least in part on the control message; and
transmitting a second sounding reference signal in a second sounding reference signal resource of the first sounding reference signal resource group based at least in part on the control message.

* * * * *